Sept. 5, 1967   L. PUN   3,339,457
FIRE CONTROL SYSTEMS
Filed June 21, 1965   8 Sheets-Sheet 1

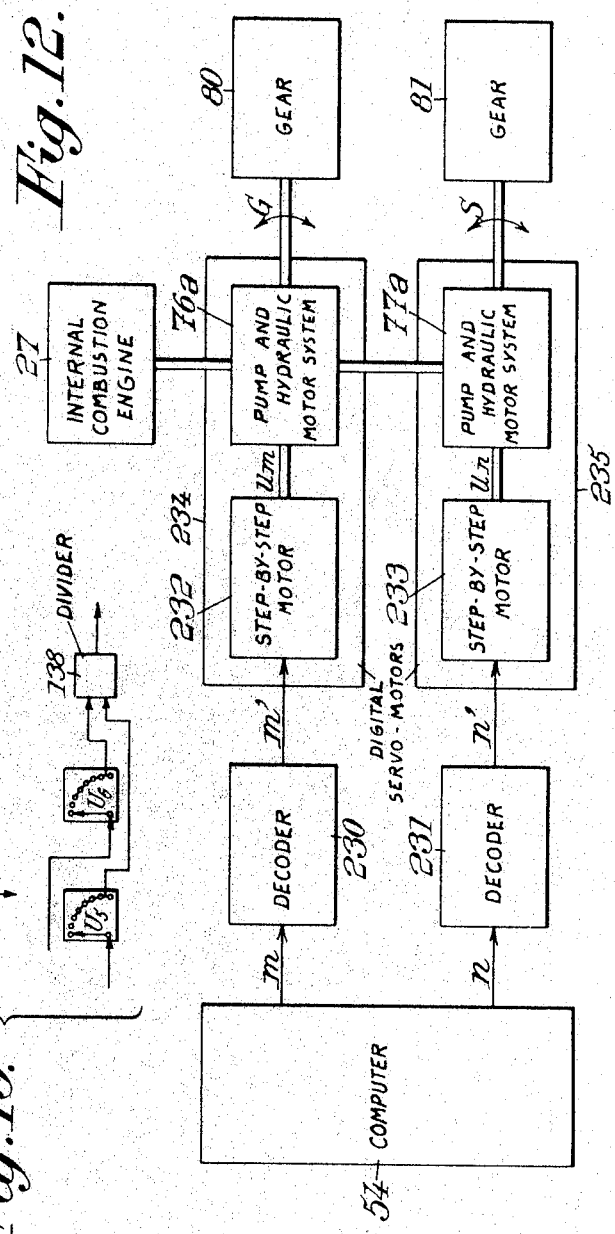
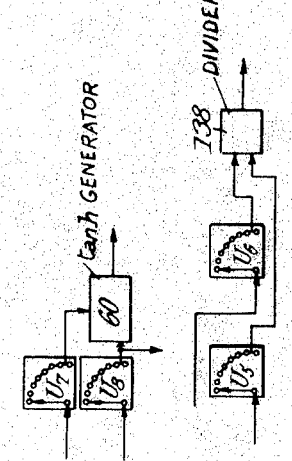
Fig. 12.
Fig. 13.

United States Patent Office 3,339,457
Patented Sept. 5, 1967

3,339,457
FIRE CONTROL SYSTEMS
Lucas Pun, Geneva, Switzerland, assignor to Brevets Aero-Mecaniques S.A., Geneva, Switzerland, a society of Switzerland
Filed June 21, 1965, Ser. No. 465,394
Claims priority, application Luxembourg, June 26, 1964, 46,404; Aug. 18, 1964, 46,787
18 Claims. (Cl. 89—41)

ABSTRACT OF THE DISCLOSURE

The angular coordinates of a target are determined continuously whereas the distance thereof is determined at regular time intervals. The angular coordinates of the gun are calculated from said angular coordinates of the target, said distance, the duration of said intervals and the firing tables, the time of flight of the projectile being calculated by an algorithm, repetitive, but without iteration, from an estimated time of flight and said duration. The target is preferably followed by a laser rangefinder.

---

The present invention relates to fire control systems, and in particular to systems of this kind for use with quick firing antiaircraft light guns. The invention is more especially concerned with systems making use of a discontinuous laser for measuring the distance of the target.

The chief object of this invention is to provide a system of this kind which is better adapted to meet the requirements of practice in particular concerning the small weight and volume of the system, its facility of use by a small number of gunners, the rapidity of spotting and facility of following the target, the quickness and precision of the determination of the distance between the gun and the target and the reliability of the system.

The system according to the present invention comprises means for determining substantially in a continuous manner the angular coordinates, in particular the bearing (or azimuth) and the site of the target which is followed substantially in a continuous manner. According to a first feature of this invention this system comprises, on the one hand, means for measuring at successive moment separated by constant intervals the distance of the target from the gun advantageously by means of a laser rangefinder working by impulses with a repetition period shorter than one second and supplying digital indications, and, on the other hand, means for determining the angular coordinates, and in particular the vertical and horizontal angular coordinates, of the gun barrel, so that a projectile fired therefrom normally strikes said target, from said angular coordinates of the target determined in a continuous manner, from the distance of the target from the gun determined at successive moments, from the duration of the time intervals between said successive moments and from firing tables giving essentially, as a function of the distance of the target, the time of flight of the projectile and the elevation angle to be given to the gun barrel, the calculated time of flight of the projectile being determined, by an algorithm, repetitive, but without iteration, from an estimated approximate time of flight of the projectile and from the duration of said time intervals.

According to another feature of the invention, in a fire control system comprising a computer determining, from the successive values of the bearing and the site of the target and from the distance of said target from the gun, the angular coordinates of the gun barrel, there are provided coders delivering the cosine and the sine of the target bearing and site for successive positions of said target, generator means for delivering the tangent of the elevation angle of the gun at least as a function of the square of the distance of the target, generator means for delivering the duration of the time of flight of the projectile at least as a function of the square of the distance of the target, computer units determining, from the respective values that have been delivered, the tangents of the angular coordinates to be given to the gun, and means for placing the gun barrel under control of said computer units, the computer being essentially of the digital type and comprising digital units which receive in the digital form the distance of the target from the gun and the respective values delivered by the coders and the generators means and deliver, also in the digital form, the tangents of the angular coordinates to be given to the gun barrel.

According to a third feature of the present invention, in a system for controlling the firing of a projectile, there are provided means for first determining, from an estimated approximate time of flight of the projectile, the coordinates of the future point where said target will be located at the end of said estimated approximate time of flight, for deducing from the indications of the firing tables a first calculated approximate time of flight corresponding to this future point, for subsequently determining, from this first calculated approximate time of flight, new coordinates of a future point corresponding to this first calculated approximate time of flight, for deducing from the indications of the firing tables, a second calculated approximate time of flight and finally for deducing a raw time of flight by the following formula:

$$T_b = \frac{(T_0 - 2dt)T_{s1} - (T_{s0})^2}{T_{s1} - 2T_{s0} + T_0 - 2dt}$$

wherein $T_b$ is the raw time of flight, $T_0$ the estimated approximate time of flight, $T_{s0}$ the first calculated approximate time of flight, $T_{s1}$ the second calculated approximate time of flight and $dt$ the duration of the time intervals between the successive determinations of the distance of the target from the gun.

According to a fourth feature of the present invention in a fire control system for a gun firing on a target, there are provided means for determining first an estimated approximate time of flight of the projectile by dividing by a predetermined number the present distance of the target from the gun, and means for immediately giving the gun barrel the firing coordinates determined from this approximate time of flight.

According to a fifth feature of the present invention, there is provided, in a fire control system for a gun firing on a target, a laser rangefinder, comprising at most rudimentary cooling means and operated, from the moment the target is first taken into charge, to perform only a small number of measurements, in particular about ten measurements, until there is obtained an accurate determination of the coordinates of the target at a given moment and of the components of its velocity vector, the subsequent positions of the target being determined by calculation, the path of travel of the target being supposed to be rectilinear and the speed of the target being supposed to be constant.

Preferred embodiments of the present invention will be hereinafter described, with reference to the appended drawings, given merely by way of example, and in which.

Figure 1:
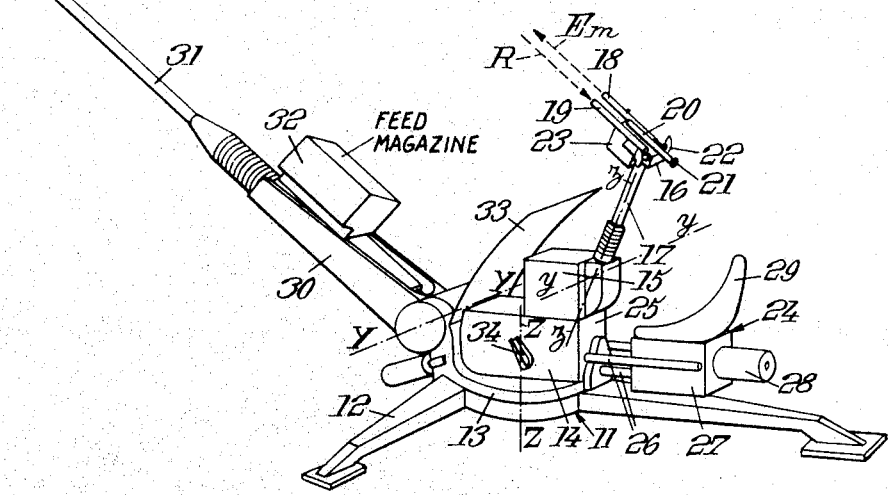
FIG. 1 is a diagrammatic perspective view of an antiaircraft gun provided with a fire control system made according to the invention.
Figure 2:
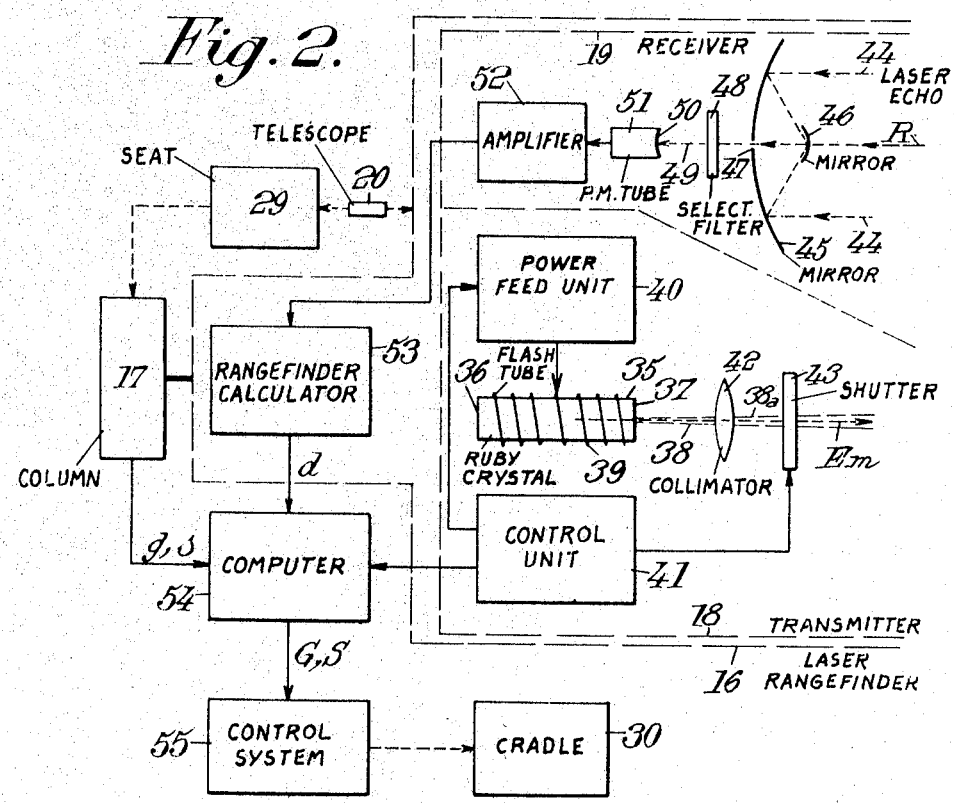
FIG. 2 is a block diagram showing the chief units of a fire control system according to the invention making use of the discontinuous distance indications supplied by a pulsed laser.
Figure 3:
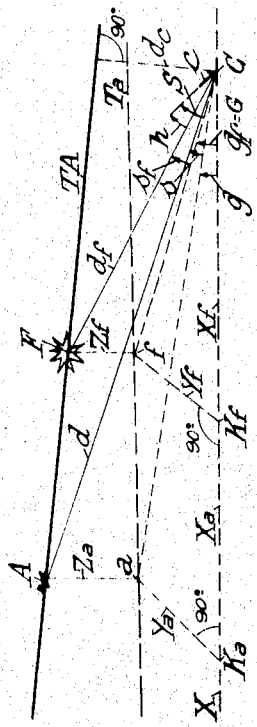
Figure 4:
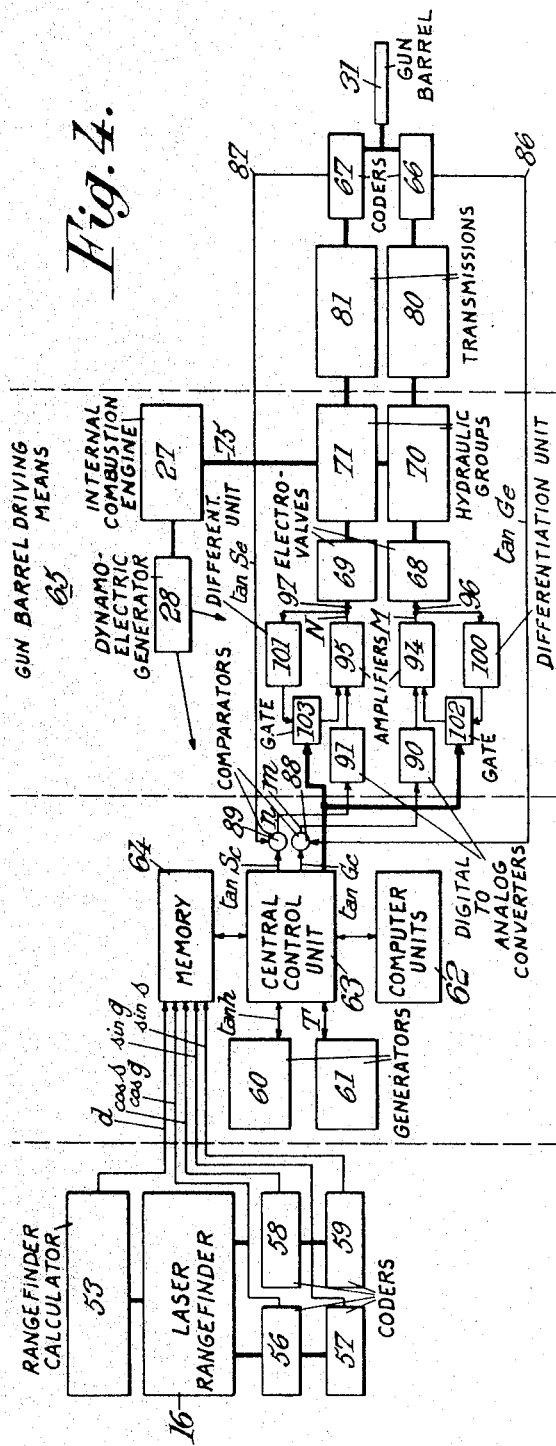
Figure 5:
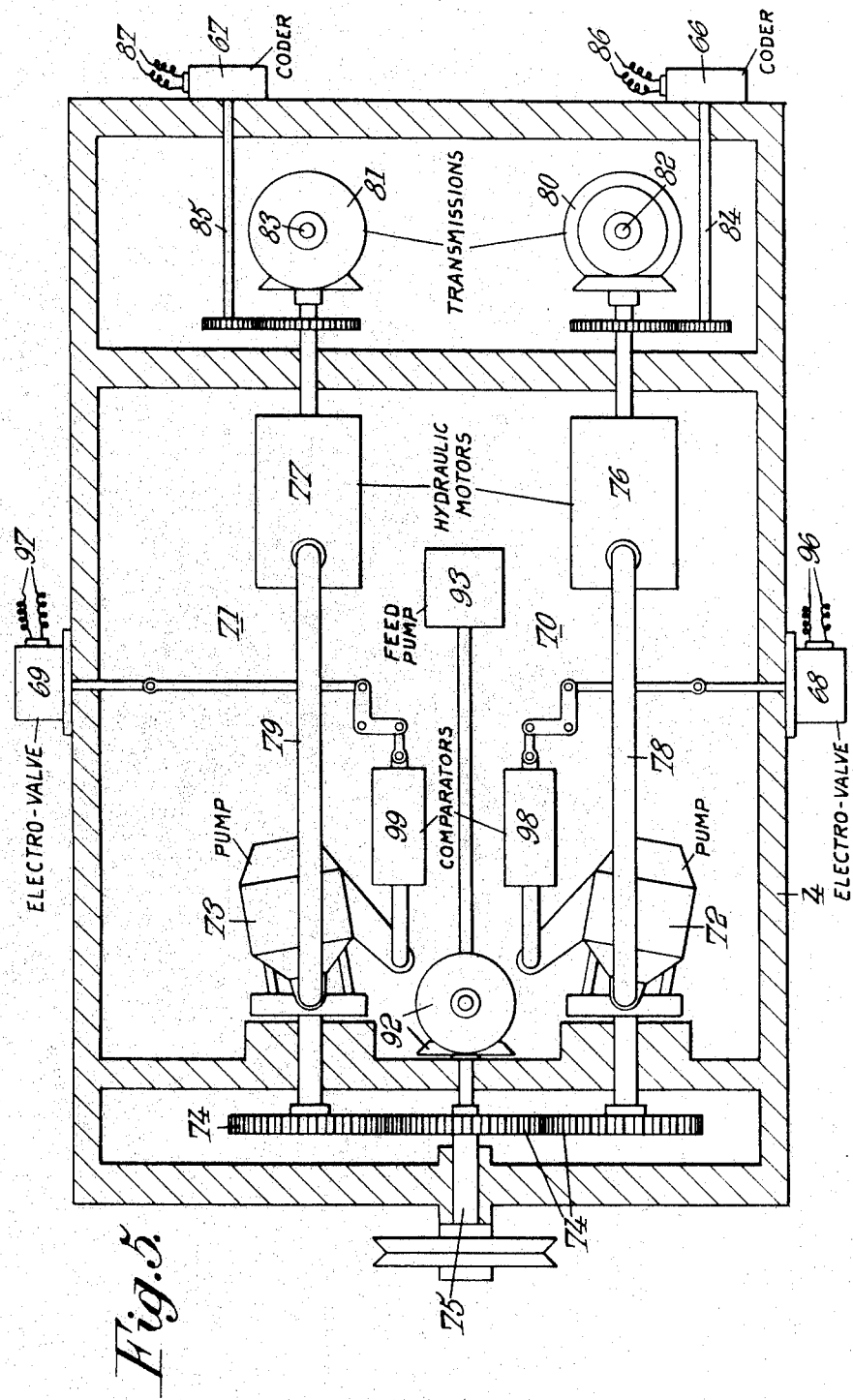
Figure 6:
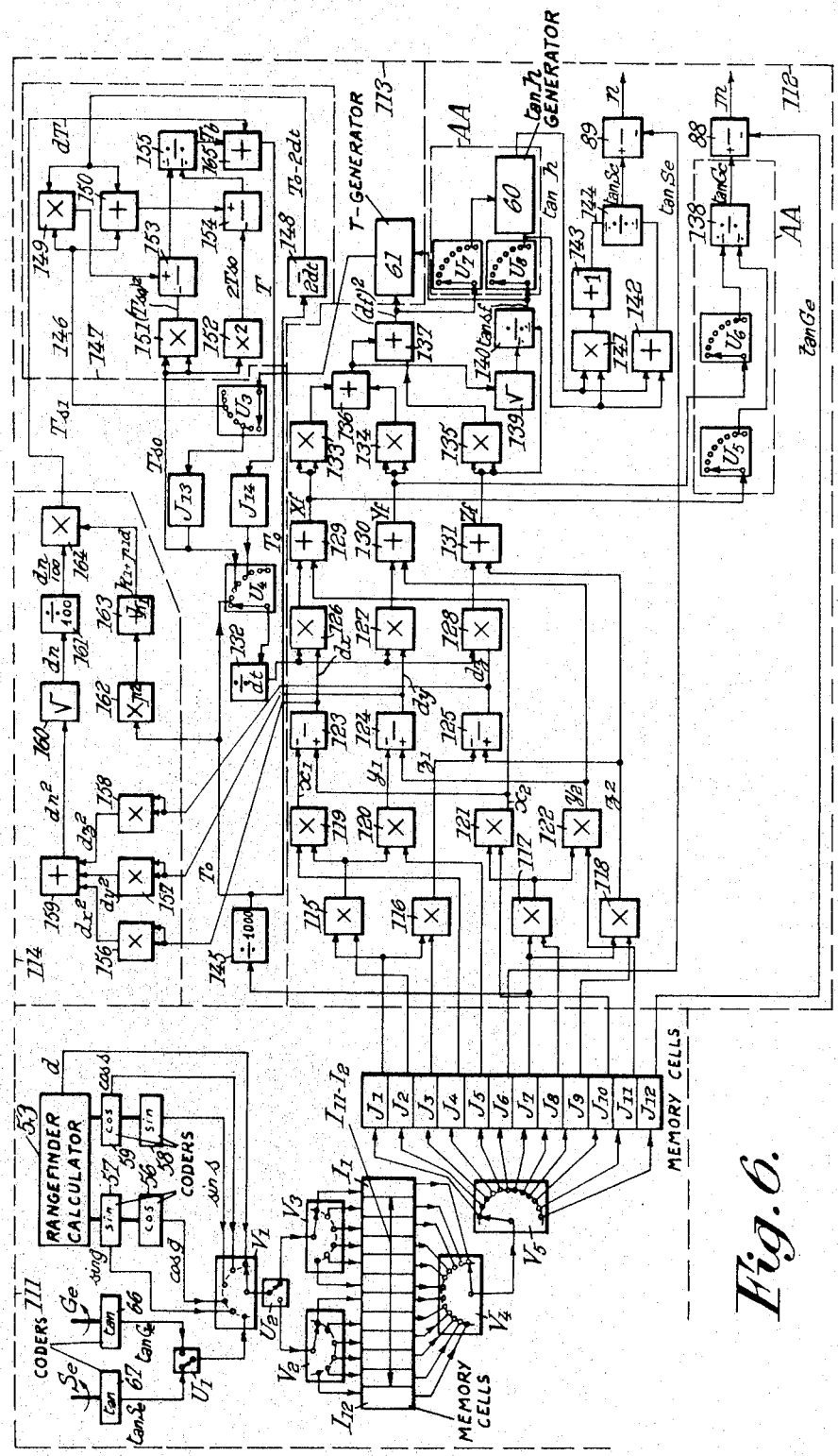
Figure 7:
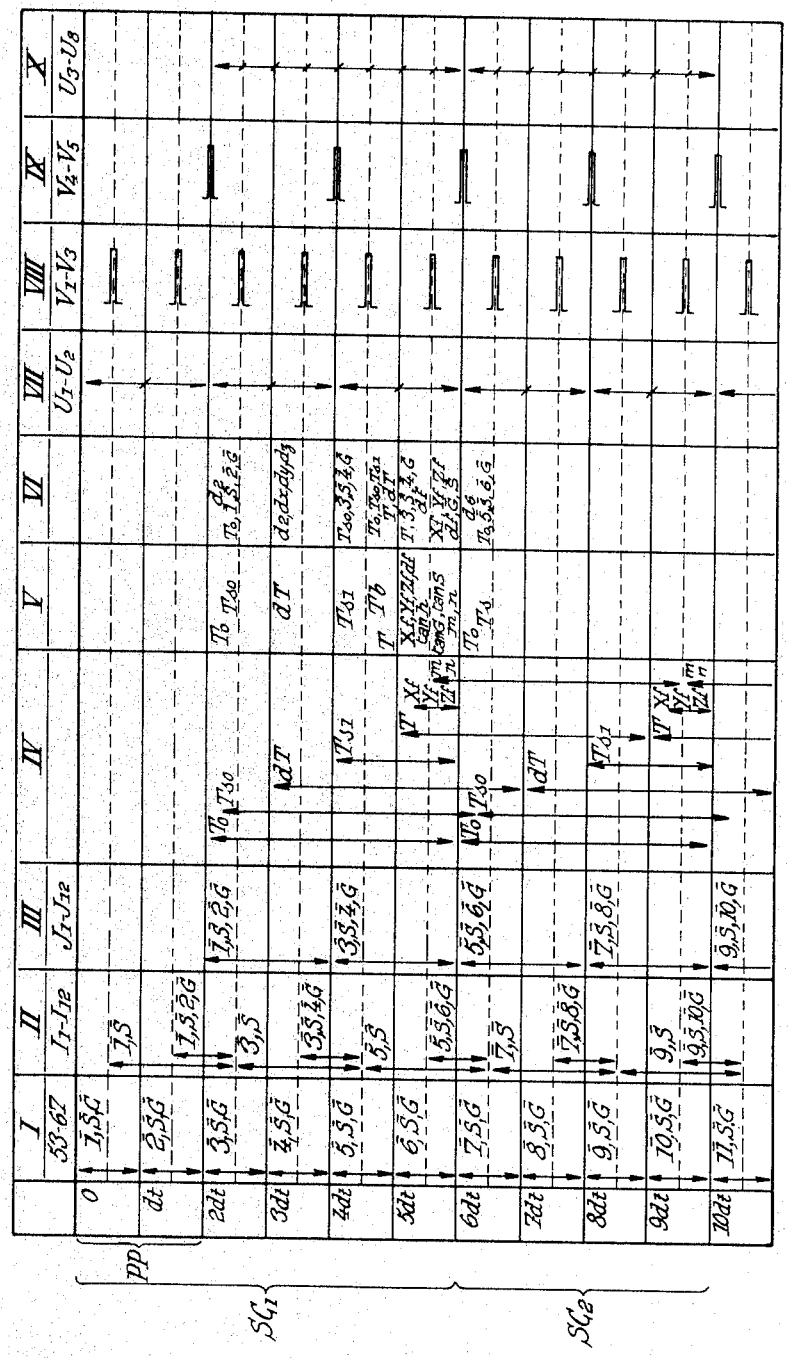
Figure 8:
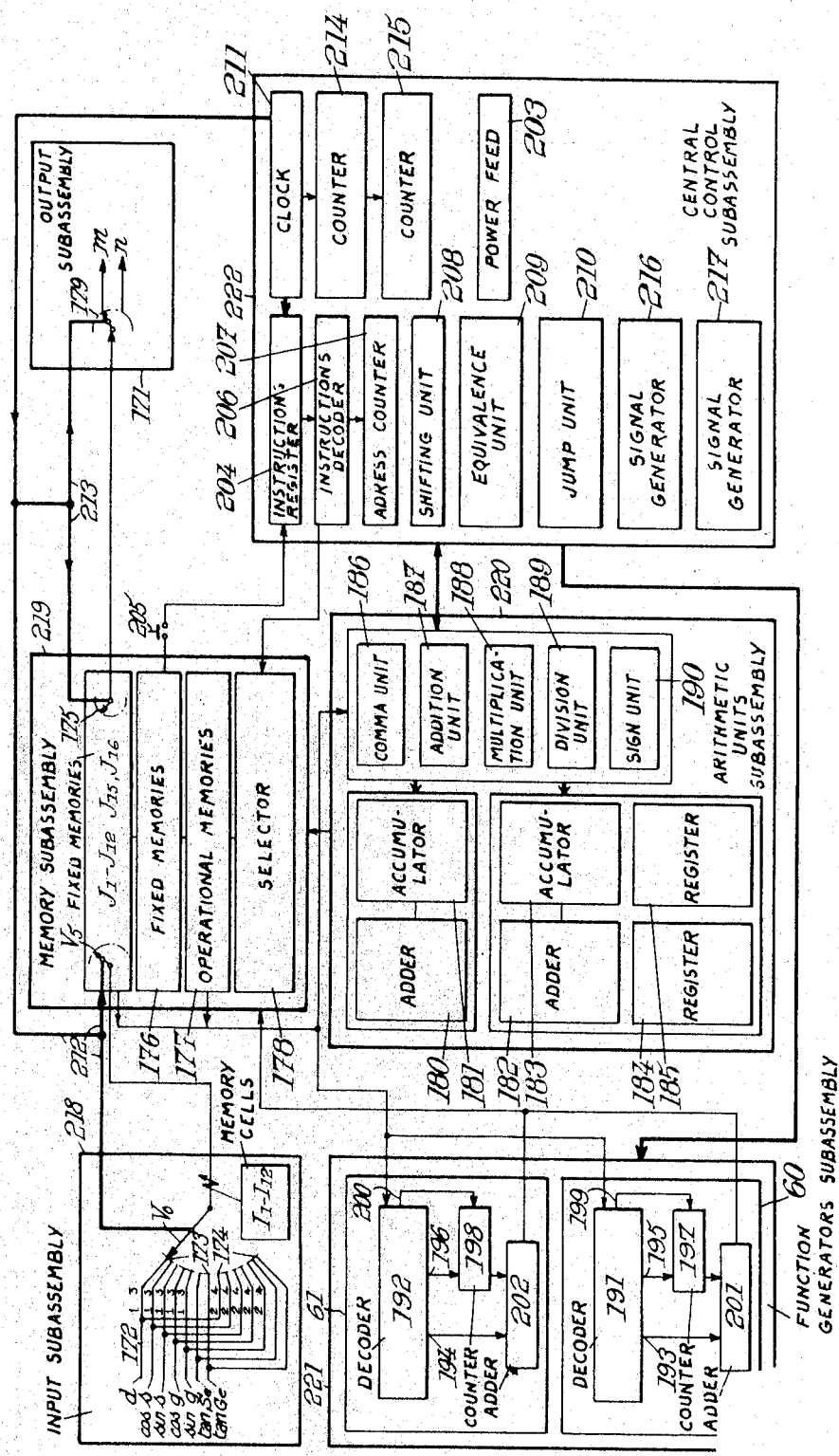
Figure 9:
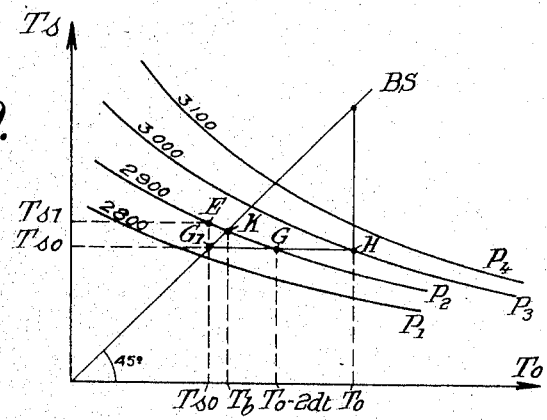

FIG. 3 diagrammatically shows the path of travel of a target such as an aircraft, the position of the gun of FIG. 1 and of its barrel and the chief angles and distances brought into play in the system of FIG. 2;

FIG. 4 is a block diagram of the tracking computer control units of the gun of FIG. 1;

FIG. 5 shows a control unit of the gun of FIG. 1;

FIG. 6 is a block diagram of the computer unit of FIG. 4;

FIG. 7 is a diagram showing the availability of the values or magnitudes and the switching phases of the computer unit of FIG. 6;

FIG. 8 illustrates a digital embodiment of the unit of FIG. 6;

FIG. 9 shows an abacus or system of curves intended to facilitate the explanation of the application of the repetitive, but without iteration, algorithm brought into play in the computer of FIG. 6 for determining the time of flight of the projectile.

Figure 10:
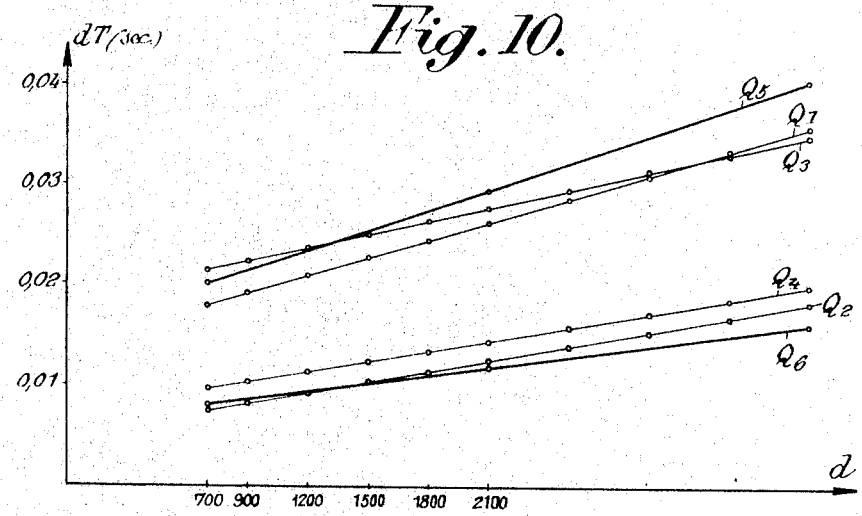
Figure 11:
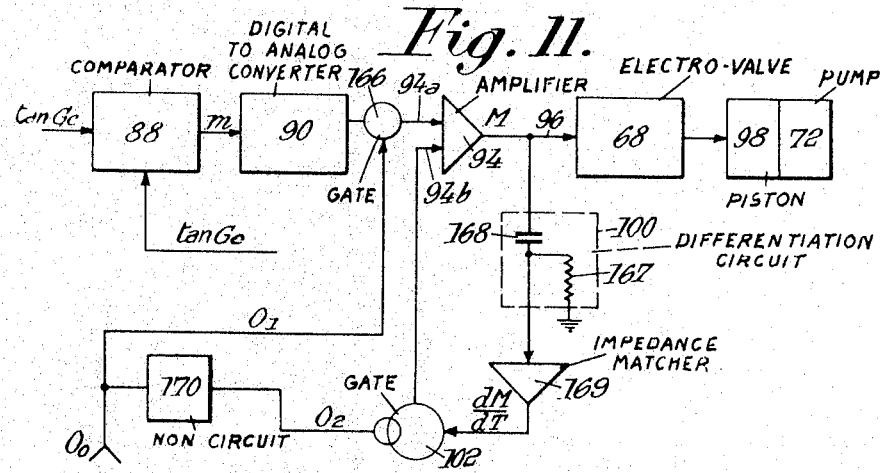

FIG. 10 is an abacus intended to facilitate explanation of the determination of the correction to be made when determining the time of flight corresponding to the duration, different from zero, of the determination of the angular coordinates of the gun barrel;

FIG. 11 is a block diagram showing a regeneration unit extrapolating the path of the target when the latter ceases to be seen by the gunner;

FIG. 12 shows a modification of the control unit;

FIG. 13 shows a modification of the portions AA of FIG. 6.

FIG. 1 diagrammatically shows a light antiaircraft gun, for instance an automatic gun of 30 mm. caliber, provided with a fire control system according to the invention.

This figure diagrammatically shows the gun mount 11, which essentially comprises a fixed base 12 and a rotary support 13 rotatable about a vertical axis ZZ.

This rotary support 13 carries the following elements:

(a) A first casing 14 containing the aiming control system which comprises a mechanism including hydraulic motors and pumps which will be hereinafter described in detail with reference to FIG. 5;

(b) A second casing 15 secured to casing 14 and containing an electronic computer, advantageously of the digital type which will be described in detail hereinafter, chiefly with reference to FIGS. 6 and 8;

(c) A laser rangefinder 16 mounted on a column 17 carried by the second casing 15, in such manner as to be rotatable about horizontal axis y—y and inclined axis z—z, this rangefinder, which will be described with reference to FIG. 2, being for instance of one of the types manufactured by the American firm "Hughes Aircraft Company" (Culver City, Calif.) under the designation of "colidar rangefinder" and which includes:

A transmitter 18 of red or infra-red coherent light pulsed signals sent in the direction shown by arrow $E_m$;

A receiver 19 for the coherent light echoes reflected from a target in the direction shown by arrow R;

A telescope 20 for sighting and optical tracking of the target, with an eyepiece 21 where the gunner who is to track the target places his eyes;

Control means 22;

A casing 23 containing a unit for calculating the distance of the target from the gun; and Means for cooling the laser (not shown);

(d) A system 24 fixed to the rear face 25 of casing 14 through supporting rods 26, said system 24 comprising:

An internal combustion engine 27, such as an internal combustion engine or a diesel engine, supplying power to the whole of the fire control system;

A dynamo-electric generator 28 driven by engine 27 and supplying the electric current necessary for the respective electronic units, the cooling means and the means for starting the laser (flash tube 39 and its power feed unit 40 as illustrated by FIG. 2); and A seat 29 for the gunner who tracks the target through eyepiece 21;

(e) A cradle 30 supporting the barrel 31 of the gun and the feed magazine 32 thereof, cradle 30 being pivotable about a horizontal axis YY; and (f) A shield 33 and a trigger pedal 34, both carried by casing 14.

FIG. 2 shows the various measurement, computer and control units of the gun of FIG. 1, further illustrating some details concerning the laser rangefinder 16. The laser, which is of the discontinuous operation type, comprises for instance a ruby parallelepipedal crystal or rod 35, constituting the active substance and having a reflecting rear face 36 and a partly transparent front face 37 for transmitting an optical beam 38 every time the active particles of the crystal have been brought to a given energy level by a helical flash tube 39 which surrounds crystal 35 and which is fed with current from a power feed unit 40 (of approximately 15 volts, 150 watts) brought into action at regular time intervals by a control device 41. It is unnecessary to give further indications concerning the operation and the starting of the ruby laser because they are well known in the art. It should merely be reminded that beam 38 is a beam of monochromatic coherent light (either red or infrared, in particular of 6943 Angstroms) very intensive in its wave length and of very small angle of aperture. This angle is still reduced by an optical collimator system 42. In particular a "colidal rangefinder" delivers a beam 38a the angle of aperture of which is of the order of magnitude of one milliradian. A shutter 43, also controlled by device 41, permits of adjusting the moments of transmission of the rangefinder beam 38a in the direction of the arrow $E_m$.

This beam is partly reflected by a target, such as an aircraft, in the same manner as a beam of UHF electromagnetic waves in a radar rangefinding system, and it returns in the form of an echo beam 44 the axis of which is R. The reflected beam 44 is concentrated by mirrors 45–46 and passes through diaphragm 47, provided in mirror 45. A selective filter 48 (which may be replaced by an amplifying laser) permits the passage of the radiations of beam 44 ranging within a very narrow frequency band the center of which corresponds to the monochromatic frequency of transmission of the ruby crystal 35 (generally 6943 Angstroms) so as to eliminate the parasitic ambient light and to increase the signal to noise ratio. The concentrated and filtered useful light echo 49 is received on the photo-cathode 50 of a photomultiplier tube 51 the output of which, representative of the amount of light received by it, is amplified in an amplifier 52. The output of amplifier 52 is sent to the computer unit 53 of the laser, housed in casing 23 (FIG. 1).

This computer unit 53, which is supplied together with the laser by the manufacturer, deduces, in particular in the digital form, the distance $d$ between the target and the laser from the time necessary for coherent light to travel from the laser to the target and back from the target to the laser (to every micro-second of time corresponds a distance of 150 m. between the laser and the target). In the case of a "colidar rangefinder," unit 53 delivers to computer 54 the distance $d$ in the digital form with an approximation of about 10 m., $d$ ranging between 400 and 4500 m. Computer 54, housed in casing 15 (FIG. 1), also receives the values of the sighting angles (to wit the bearing $g$ and the site $s$) from casing 23, carried by column 17 displaced by the gunner. Said gunner, seated on seat 29, looks through telescope 20, to keep the image of the target on the point of intersection of the cross-wires of said telescope, angles $g$ and $s$ representing the spherical coordinates of the axis of telescope 20.

Computer 54 (started in operation by control device 41) determines, according to the present invention and as it will be hereinafter described, the horizontal G and vertical S angular coordinates of the barrel 31 (FIG. 1) of gun 1 so that a projectile fired from said gun reaches the target. Control system 55, located in casing 14 gives cradle 30 and therefore gun barrel 31 the angular positions, with respect to axes ZZ and YY, corresponding to said angles G and S respectively.

Before describing the improvements according to the present invention the theory of prediction in antiaircraft systems will be shortly reminded with reference to FIG. 3.

FIG. 3 shows, at TA, the path of travel, supposed to be rectilinear, of a target during the period it is tracked by the fire control system supposed to be positioned, together with the antiaircraft gun, at point C. The axis of the gun barrel 31 is shown at c. On this path of travel TA, the target has been shown in two particular positions thereof, to wit a position A called "present position," which is the position of the aircraft when its coordinates are measured by the fire control device, and a position F, called "future" or "set forward position," which is the position of the target when it is struck by a projectile fired from the gun barrel if prediction and fire control are correct.

The various factors to be taken into account are designated, in FIG. 3 by the following references:

C—gun;
c—gun barrel;
CX—reference line (North-South) in the horizontal plane of gun C;
A—present position of the target;
a—vertical projection of A on the horizontal plane of gun C;
$K_a$—projection of $a$ on reference line CX;
$X_a$, $Y_a$, $Z_a$—coordinates of the present position A of the target;
g—bearing (or azimuth) of the present position A;
s—site of the present position A;
d—distance from gun C to present position A;
F—future, or set forward, position of the target;
f—vertical projection of F on the horizontal plane of gun C;
$K_f$—projection of $f$ on reference line CX;
$X_f$, $Y_f$, $Z_f$—coordinates of the future position F of the target;
$g_f$—bearing (or azimuth) of the future position F, equal to the bearing (or azimuth) G of the gun firing a projectile which strikes the target in position F;
$s_f$—site of future position F;
$d_f$—distance from gun C to future position F;
h—angle of elevation of gun barrel c;
S—equal to $s_f+h$, angle of gun barrel c with the horizontal plane;
TA—path of travel of the target;
$T_a$—projection of TA on the horizontal plane;
$d_c$—distance of gun C to the path of travel of the target;
$v_x$, $v_y$, $v_z$—components of the speed v of the target between positions A and F, this speed v being an algebraic value, positive for an aircraft flying away from gun C and negative for an aircraft flying toward said gun.

The following relations exist between these factors:

$$G = g_f \tag{1}$$
$$S = s_f + h \tag{2}$$
$$X_f = X_a + v_x \cdot T \tag{3}$$
$$Y_f = Y_a + v_y \cdot T \tag{4}$$
$$Z_f = Z_a + v_z \cdot T \tag{5}$$
$$(d_f)^2 = (X_f)^2 + (Y_f)^2 + (Z_f)^2 \tag{6}$$
$$\tan s_f = \frac{Z_f}{\sqrt{(X_f)^2 + (Y_f)^2}} \tag{7}$$
$$\tan g_f = \frac{Y_f}{X_F} \tag{8}$$

According to the main feature of the invention:

On the one hand, the angular coordinates, and in particular the bearing (or azimuth) g and the site s of the target, tracked substantially in a continuous manner (continuity being ensured by extrapolation when the target is lost of view by the gunner), are determined substantially in a continuous manner and the distance d of the target from the gun, at successive moments $t_1$, $t_2$, $t_3$, etc., such that the period of repetition $dt$ is lower than one second, is determined by means of a laser rangefinder, and On the other hand the angular coordinates, in particular the horizontal angle G and the vertical angle S of gun axis c, that must be given to gun barrel 31 to cause a projectile fired from said gun to strike the target are determined from said angular coordinates g, s, of the target, from said distance d of the target, from said period of repetition $dt$ and from firing tables giving, essentially as a function of the distance of the target from the gun, the time of flight T of the projectile and the elevation angle h to be given to the axis c of the gun barrel, the calculated time of flight $T_c$ of the projectile being determined, by an algorithm, repetitive, but without iteration, from an estimated approximate time of flight $T_0$ of the projectile and from the value of said time intervals.

According to a second feature of the invention, there is provided a computer 54 which determines, from the bearing g and the site s of target A (determined by the position of the casing 23 of the rangefinder) and from the distance d from the target to the gun (supplied by the unit 53 of the rangefinder), the bearing G and the vertical angle S of the axis c of the gun barrel 31.

This computer 54 comprises:

Coders 56, 57, 58, 59, relative to the bearing and the site of the target, which respectively deliver cos g, sin g; cos s, sin s;

A generator 60 delivering tan h, that is to say the tangent of the elevation angle h of the gun barrel, as a function of at least the square $d^2$ of the distance from the target to the gun;

A generator 61 delivering the value T of the time of flight of the projectile, at least as a function of the square $d^2$ of the distance of the target from the gun;

Computer units 62 determining, from the respective values that are delivered thereto by a central control unit 63 from memories 64 storing up the values of d, cos g, sin g; cos s, sin s and from generators 60, 61, the tangents of the calculated angular coordinates of the gun tan $G_c$ and tan $S_c$, and means 65 for giving gun barrel 31 the position corresponding to the values of tan $G_c$ and tan $S_c$, for instance by comparing the values of tan $G_e$ and tan $S_e$ of the gun barrel (delivered by coders 66 and 67 relative to the effective horizontal and vertical angular coordinates of barrel 31) with the calculated values of tan $G_c$ and tan $S_c$, through elements 68, 69 (electrovalves) which determine the angular position of the gun barrel, to reduce to zero the differences m and n between the actual or present value and the calculated value of tan G and tan S respectively. The computer is essentially of the digital type and comprises computer units 62 which receive in the digital form the distance d of the target and the respective values delivered by the coders (cos g, sin g; cos s, sin s) and the generators (tan h, T) and deliver, also in the digital form, the tangents of the bearing and the site of the gun barrel axis (tan $G_c$, tan $S_c$).

The means for controlling and aiming gun barrel 31 may advantageously comprise (FIGS. 4 and 5) two hydraulic groups 70, 71, respectively for the bearing and the site of the gun and two systems for regulating these groups.

Every hydraulic group 70–71 comprises:

A variable output pump 72–73, driven through gears 74 from internal combustion engine 27, which drives shaft 75 with a constant number of revolutions per minute (also driving feed pump 93 through gears 92), and A hydraulic motor 76, 77 fed, through a pipe 78, 79, with the fluid (oil for instance) delivered by the corresponding pump 72, 73, this hydraulic motor acting through transmission 80 on the shaft 82 serving to control the bearing of the gun and through transmission 81 on the shaft 83 serving to control the vertical component of the angular position of the gun. Said hydraulic motor further acts upon the input shaft 84, 85 of the bearing coder 66 or of the vertical angle coder 67 respectively, which supplies, through conductors 86, 87 the successive values of tan $S_e$ and tan $G_e$, respectively.

The regulating system for the gun angular coordinates comprises:

A comparator 88, 89, comparator 88 receiving tan $G_e$ and tan $G_c$—and—$m$=tan $G_c$—tan $G_e$, whereas comparator 89 receives tan $S_e$ and tan $S_c$ and delivers $n$=tan $S_c$—tan $S_e$, Possibly, if the computer units 62 act upon digital values and if coders 66 and 67 deliver tan $G_e$ and tan $S_e$ in the form of digital values, a digital-analog converter 90-91 transforming the digital value of $m$, $n$ into a voltage proportional to this value and of the same sign as it, An amplifier 94-95, amplifying the output voltage of converter 90, 91 (or of comparator 98, 99 when the output thereof is of the analog type and there is no reason to convert it) and therefore delivering a control voltage M, N representative of the difference $m$, $n$, respectively, An electro-valve 68, 69 receiving M, N, respectively, through conductors 96, 97 and actuating, in accordance with the value of M, N, the control piston 98, 99 of pump 72, 73 to adjust the output thereof, this output depending upon M, N, and becoming zero when M, N becomes zero, and An extrapolation loop making it possible to follow the target in a continuous manner in case of loss of sight thereof, this loop, which will be hereinafter described with reference to FIG. 11, regenerating M, N, respectively, and including for this purpose a differentiating unit 100-101 which delivers the derivative of M, N as a function of time, and a gate 102, 103, which is normally closed and is opened by the central control unit 63 when the latter ceases to be fed with correct values of the cosine and the sine of $g$ and $s$ respectively (a complete embodiment of such a loop will be hereinafter described with reference to FIG. 11).

Owing to this arrangement, which brings $G_e$ to value $G_c$ and $S_e$ to value $S_c$, the axis $c$ of the gun barrel 31 is permanently kept in the direction, having angular coordinates G and S, for which a projectile fired by the gun reaches target F if the calculation of F from point A has been correctly performed (and if the target has kept moving as far as F along a path of travel TA deduced from A and from the prior positions).

Besides, there will be hereinafter described with reference to FIG. 12 a modification which comprises neither a digital-analog converter, nor analog actuating units but directly digital control actuating units.

It will now be explained, with reference to FIGS. 6 and 7, how the coordinates of the future point F are calculated in a preferred embodiment of a fire control system made according to the present invention.

Calculation or prediction of the future position F, in fact of the angles G and S for pointing the gun, from continuous indications of the target bearing and site that are observed and from discontinuous indications of the distance from the target to the gun (coordinates of point A) essentially brings into play the following formulas derived from Formulas 1 to 8 and wherein:

$A_1$, $A_2$, $A_3$ are the successive positions of A at the moments of measurement of $d$, to wit 0, $dt$, $2dt$ . . . , from an initial moment called zero time, where $A_1$ is determined, $d_1$, $d_2$, $d_3$ the successive distances $CA_1$, $CA_2$, $CA_3$ . . . , at moments 0, $dt$, $2dt$ . . . , $g_1$, $g_2$, $g_3$ the values of $g$ corresponding to $A_1$, $A_2$, $A_3$ . . . , obtained by sampling from the continuous measurement of $g$, and $s_1$, $s_2$, $s_3$ the values of $s$ corresponding to $A_1$, $A_2$, $A_3$ obtained by sampling from the continuous measurement of $s$.

In order to determine the cartesian components $v_x$, $v_y$, $v_z$ of the speed $v$ of the target aircraft, present in Formulas 3 to 5 and therefore in Formulas 6, 7, 8, 1 and 2, it is necessary to make use of two sets of measurements of $d$, $g$ and $s$ taken at a known time interval $dt$, the (mean) speed being equal to the ratio of the distance travelled along to the time taken to travel said distance. The first determination of the components of $v$ can therefore take place only at time or moment $dt$, after measurement of the values of $d_1$, $g_1$, $s_1$ and $d_2$, $g_2$, $s_2$. If $x_1$, $y_1$, $z_1$ are the cartesian coordinates of $A_2$ at time $dt$ the following relations exist.

$$v_x = \frac{x_2-x_1}{dt} = \frac{1}{dt}(d_2 \cos s_2 \cos g_2 - d_1 \cos s_1 \cos g_1) \quad (9)$$

$$v_y = \frac{y_2-y_1}{dt} = \frac{1}{dt}(d_2 \cos s_2 \sin g_2 - d_1 \cos s_1 \sin g_1) \quad (10)$$

$$v_z = \frac{z_2-z_1}{dt} = \frac{1}{dt}(d_2 \sin s_2 - d_1 \sin s_1) \quad (11)$$

so that the coordinates of the future point F after a time of flight T (supposed to be known) from $A_2$, and therefore corresponding to a distance $v.T$ travelled along by the aircraft along path of travel TA are:

$$X_f = x_2 + v_x \cdot T = \left(1 + \frac{T}{dt}\right) d_2 \cos s_2 \cos g_2 - \left(\frac{T}{dt}\right) d_1 \cos s_1 \cos g_1 \quad (12)$$

$$Y_f = y_2 + v_y \cdot T = \left(1 + \frac{T}{dt}\right) d_2 \cos s_2 \sin g_2 - \left(\frac{T}{dt}\right) d_1 \cos s_1 \sin g_1 \quad (13)$$

$$Z_f = z_2 + v_z \cdot T = \left(1 + \frac{T}{dt}\right) d_2 \sin s_2 - \left(\frac{T}{dt}\right) d_1 \sin s_1 \quad (14)$$

The successive values of $X_f$, $Y_f$, $Z_f$ are obtained by increasing every time by two units the indexes of $d$, $s$ and $g$.

The laser rangefinder 60 delivers the values of $d$ at moments or times 0, $dt$, $2dt$ . . . , therefore $d_1$, $d_2$, $d_3$ . . . , whereas coders 56, 57, 58, 59, associated with this rangefinder and with the aiming device 20 that cooperates therewith, supply (after sampling) $s$ and $g$ at the same moments, therefore $s_1$, $s_2$, $s_2$ . . . and $g_1$, $g_2$, $g_2$ . . . . The value of $dt$ is known: it is the period of repetition of the distance measurements by the rangefinder and of sampling of $s$ and $g$. Finally T is determined, as it will be hereinafter explained in a detailed fashion, by taking account of the firing tables which give T essentially as a function of the distance $d_f$ of the future point F, without iteration by means of a new particular algorithm.

As a matter of fact, it is impossible to determine T directly from $d_f$, because $d_f$ is given by Formula 6 which contains $X_f$, $Y_f$, $Z_f$ determined by Formulas 12, 13, and 14 which themselves contain T supposed to be known.

Once $X_f$, $Y_f$, $Z_f$ are calculated, there is obtained:

On the one hand $s_f$ or rather tan $s_f$, given by Formula 7, so that Formula 2 gives S, or rather tan S, according to the formula $$\tan S = \tan (s_f + h) = \frac{(\tan s + \tan h)}{(1 + \tan s_f \cdot \tan h)} \quad (15)$$

which is a direct consequence of Formula 2, $h$ being given by the firing tables as a function of $(d_f)^2$ obtained from Formula 6, On the other hand, $g_t$, or rather tan $g_t$, given by Formula 8, from which there is obtained tan G, identical to tan $G_t$, because $G=g_t$ (Formula 1).

The determination of T will now be described with reference to FIGS. 9 and 10, FIG. 9 corresponding to the rough determination of T according to the third feature of the invention so as to supply the rough value $Tb$ of T, whereas FIG. 10 relates to the determination of the correcting term $dT$ to be added to $Tb$ to take into account the duration, which is not zero, of the determination of $Tb$, during which the target has moved some distance and is no longer at $A_1$, or $A_2$, $A_3$ . . . for the first, second . . . determinations of $Tb$. Therefore, for instance $X_f$ is not exactly equal to $x_2+v_x.Tb$ for the first determination of F but to $(x_2+dx)+v_x.Tb$, $dx$ being the component along axis CX of the distance $dn$ travelled over by the target during determination of $Tb$.

The determination of $Tb$ (without taking into account the correction corresponding to the duration of this determination) is performed by starting from an estimated value $To$ of T. Starting from $d_1$, $s_1$, $g_1$, $To$, $d_2$, $s_2$, $g_2$, Formulas 12, 13, 14 permit of calculating the approximate values of $X_f$, $Y_f$, $Z_f$. Then Formula 6 permits of calculating an approximate value of $(d_f)^2$. The firing tables supply an approximate calculated time $T_s$ corresponding to $(d_f)^2$. As a rule $T_s$ is different from $To$ (it would be equal to $To$ if $To$ were the exact value of T, or rather $Tb$. As a matter of fact, $Ts$ is a function of $To$ and of parameters $d$, $s$ and $g$. For predetermined average initial conditions (speed of the target, characteristics of its path of travel) $Ts$ is equal to $f(To, d)$. To every value of $d$ there corresponds a curve giving $Ts$ as a function of $To$. FIG. 9 illustrates a plurality of such curves $P_1$, $P_2$, $P_3$, $P_4$ for values of $d$ equal to 2800, 2900, 3000 and 3100 meters respectively, $To$ being plotted in abscissas and $Ts$ in ordinates. Straight line BS, which is the bisector of the axes of coordinates, constitutes the geometrical locus of the points for which $Ts$ is equal to $To$, that is to say for which $Ts=To=$the correct value of $Tb$. The exact value of $Tb$ is therefore at the intersection of bisector BS and of the curve $Ts=f(To)$ corresponding to the future value of the distance, therefore to $d_f$. This is why the prior methods of determining the time of flight by iterations are long, because, as the calculation by iteration is going on, the useful curve P is moved.

The method of calculating $Tb$ according to the third feature of the invention is based upon the fact that the respective measurements are made at known time intervals $dt$.

There is first taken as approximate value $To$ obtained by dividing the distance $d$ by a given number. In particular $To$ may be taken, in seconds, as equal to one thousandth (or a fraction of this order) of the distance $d$ in meters, this division by one thousand corresponding to the normal speeds of aircrafts for the usual initial angles of site. If it is supposed, by way of example, that the value of $d_1$ is equal to 3000, then $$To=\frac{3000}{1000}=3 \text{ seconds}$$

The vertical having $To$ as abscissa intersects curve $P_3$ at point H, of ordinate $Tso$. If $G_1$ is the point where the horizontal line passing through H intersects bisector BS, the abscissa of $G_1$ is $Tso$.

The second series of determinations will take place after a time interval of $2dt$. Therefore, the distance of the aircraft will be $d_3$ corresponding to a new curve P, for instance curve $P_2$ (unknown but looked for) in FIG. 9, such that GH (G being the intersection of horizontal line $HG_1$ with this curve $P_2$) is equal to $2dt$. If, at this time $2dt$, $Tso$ is taken as new approximate value of T, the new value $Ts1$ of $Ts$ will be the ordinate of the point E of intersection of the vertical having as abscissa $Tso$ and passing through $G_1$ with the curve, such as $P_2$, comprising point G. This intersection point E being not upon bisector BS, $Tso$ and $Ts1$ are not identical and therefore do not represent correct values of $Tb$. The correct value is, on the contrary, given by the abscissa (and the ordinate) of the intersetcion K of BS with the curve $P_2$ upon which G is located.

The approximate slope $EF/FG$ of this curve $P_2$ at point K is given by the following formula $$p=\frac{Ts1-Tso}{Tso-(To-2dt)}$$

The coefficient of partition $q$ by $Tb$ of segment $Tso$, To $-2dt$ is given by the formula $$q=\frac{p}{p-1}$$

Therefore $Tb=(To-2dt)q+Tso(1-q)$ with $$q=\frac{Ts1-Tso}{Ts1-2Tso+(To-2dt)}$$

consequently $$T_b=\frac{(To-2dt)(Ts1-Tso)+Tso(To-Tso-2dt)}{Ts1-2Tso+To-2dt}=$$
$$(To-2dt)Ts1-(Tso)^2 \quad (15)$$

Finally, $Tb$, that is to say the rough value of T, is calculated from:

$dt$, known initially, $To$, taken equal to $d_2/1000$ and therefore available after time $dt$, $Tso$, which can be calculated after time $2dt$, $Ts1$ which can be used after time $4dt$ as hereinafter explained.

This rough value $Tb$ must be corrected by a value $dT$ taking into account the movement of the target during the time of calculation $2dt$ of $Tb$, to obtain the correct value of T.

Considering FIG. 3, it is seen that it is possible to find the values of the travel $dn$ (and its components $dx$, $dy$, $dz$) of the target during time $2dt$ from A, as a function of the speed $v$ of the target, of distance $d$ and of the minimum distance $d_c$ from point C to the path of travel TA. Then, starting from $dn$, $dT$ [which is a function of $dn$, $v$ and $d$] is determined.

FIG. 10 shows the curves (straight lines) Q representing the variation of $dT$, as a function of $d$, for typical values of $v$ and $d_c$ and for $2dt=0.1$ second, the circles corresponding to the calculated points. These straight lines Q correspond to the general formula $$dT=(k_1+p_1d)\cdot\frac{dn}{100}$$

The following table of values is obtained:

| Curves | v (m./sec.) | $d_c$ (m.) | $k_1$ | $p_1$ |
| --- | --- | --- | --- | --- |
| $Q_1$ | 250 | 600 | 0.0550 | 0.000024 |
| $Q_2$ | 100 | 600 | 0.0500 | 0.000036 |
| $Q_3$ | 250 | 200 | 0.0735 | 0.000018 |
| $Q_4$ | 100 | 200 | 0.0740 | 0.000034 |
| $Q_5$ | 250 | adopted mean values | −0.062 | 0.000027 |
| $Q_6$ | 100 | | | |

By adopting the mean values $k_1=0.062$ and $p_1=0.000027$, the error is smaller, in absolute value, than 4 milliseconds and, in relative value, than 1%.

Therefore, finally, one may take $$dT = \left(0.062 + \frac{0.027 \cdot d}{1000}\right) dn \quad (16)$$

$dT$ being in seconds and $d$ and $dn$ in meters. For the successive determinations, there is taken, for $d$, the values $d_2, d_4, d_6 \ldots$; as for $dn$, it is given the following formulas:

$$dn\sqrt{(dx)^2 + (dy)^2 + (dz)^2} \quad (17)$$

with $$dx = d_2 \cos s_2 \cos g_2 - d_1 \cos s_1 \cos g_1 \quad (18)$$

$$dy = d_2 \cos s_2 \sin g_2 - d_1 \cos s_1 \sin g_1 \quad (19)$$

$$dz = d_2 \sin s_2 - d_1 \sin s_1$$

Finally $$T = Tb + dT \quad (20)$$

Of course the accurate values of $k_1$ and $p_1$ and also that of the number by which $d$ is divided to obtain $To$ depend upon the type of engagement or action of the target, upon the gun and upon the projectile.

Referring now to FIG. 6, the different determinations are performed from the indications of coders 56, 57, 58, 59, which respectively deliver cos $g$, sin $g$, cos $s$, sin $s$, of coders 66, 67, which deliver the effective values of tan $G_e$ and tan $S_{11}$ and of generator means 60, 61 which deliver the time of flight $T$ and the tangent of the elevation angle, tan $h$, respectively, essentially as a function of $d^2$ (and possibly of tan S) by means of units performing the following elementary operations:

Addition, represented by the symbol _____ +
Subtraction, represented by the symbol _____ —
Multiplication, represented by the symbol _____ ×
Division, represented by the symbol _____ ÷
Extraction of a square root, represented by the
  symbol _____ √

For the units performing an addition or a multiplication, the two inputs are not differentiated from each other. For the substraction units the input term from which the subtraction is effected is designated by + and the term to be subtracted is designated by —. For the division units the input corresponding to the dividend is represented by ÷ and the input corresponding to the divisor by ÷. Finally, the units of the computer illustrated by FIG. 6 also have to perform multiplication or division by a given number, for instance multiplications by $p_2$ (unit designated by the legend $xp_2$), divisions by 1000 (unit designated by ÷1000) or the addition of a constant such as $k_1$ (unit designated by +$k_1$).

Finally this computer comprises memories represented by reference letters I, J with different indexes, and switches, designated by reference letters U and V with different indexes, the diagram of the phases or switching times of switches U and V being illustrated by FIG. 7.

A complete cycle of prediction of the future point F comprises, as above stated, the determination of two successive values of $d$, $g$ and $s$ necessary for determining $v$. On the contrary, a single determination of $S_e$ and $G_e$ is sufficient per cycle. It is therefore necessary to store up two successive values of each of the analog values of $d$, cos $g$, sin $g$, cos $s$, sin $s$ and a single value of tan $G_e$ and tan $S_e$ that is to say a total of twelve values. The arithmetic operations being performed on these twelve values (and those supplied by generator means 60, 61). For these twelve values are therefore provided twelve memories $J_1, J_2 \ldots J_{12}$ intended to store up, after two measurements (at time $dt$), after four measurements (at time $3dt$), after six measurements (at time $5dt$) . . ., the values of the following magnitudes:

The twelve fixed memories $J_1$ to $J_{12}$ are fed from units 53, 56, 57, 58, 59, 66, 67, through twelve intermediate memories $I_1$ to $I_{12}$, temporarily storing up the values of $d$, cos $s$, sin $s$, cos $g$, sin $g$, tan $S_e$ at times or moments 0, $2dt$, $4dt$, . . . and of $d$, cos $s$, sin $s$, cos $g$, sin $g$, tan $G_e$ at times $dt$, $3dt$, $5dt$ . . ., by means of switches $U_1$, $V_1$, $U_2$, $V_2$, $V_3$, $V_4$ and $V_5$.

Switch $V_1$ is a six positions switch which receives on every cycle successively, when its movable part rotates in the anticlockwise direction from the end position on the right where it is represented: $d$, cos $s$, sin $s$, cos $g$, sin $g$ and either tan $G_e$ or tan $S_e$ according to the position of switch $U_1$. Switch $U_2$ connects the output of $V_1$ now with $V_2$ now with $V_3$. $V_2$ and $V_3$ are six positions switches rotating in synchronism with switch $V_1$ in the clockwise direction from the end position shown by the drawing. As for switches $V_4$ and $V_5$, they work in synchronism for ensuring the transfer of the contents of the twelve intermediate memories $I_1, I_2 \ldots I_{11}, I_{12}$ to the twelve fixed memories $J_1, J_2, \ldots J_{11}, J_{12}$, in fact from $I_1$ to $J_1$, from $I_2$ to $J_2$ . . . from $I_{11}$ to $J_{11}$ and from $I_{12}$ to $J_{12}$.

Transfer of the magnitudes from the input units 53, 56, 57, 58, 59, 66, 67 to memories $J_1, J_2, \ldots J_{11}, J_{12}$ (FIG. 6) is performed as follows, reference being made to FIG. 7, columns I, II, III, VII, VIII and IX wherein have been shown respectively the availability of the magnitudes to the input coders 53, 56, 57, 58, 59, 66, 67 (I) to memories $I_1, I_2, \ldots I_{11}, I_{12}$ (II), to memories $J_1, J_2, \ldots J_{11}, J_{12}$ (III) and the diagrams of the phases of $U_1$ and $U_2$ (VII), $V_1$, $V_2$ and $V_3$ (VIII) and $V_4$ and $V_5$ (IX).

In columns I, II, and III have been symbolically inscribed the available magnitudes (in the coders, in memories $I_1, I_2, \ldots I_{11}, I_{12}$ and in memories $J_1, J_2, \ldots J_{11}, J_{12}$ respectively, as already stated), for every period $0-dt$, $dt-2dt$, . . . $10dt-11dt$, separated into two sub-periods by the switching (of total transfer duration small with respect to $dt$) of the six positions switches $V_1$, $V_2$ and $V_3$ indicated in the form of a horizontal pulse, same as that of the six positions switches $V_4$ and $V_5$ (whereas the two positions switches $U_1$ and $U_2$ have their positions shifted at the end of every period, the duration of shifting from one position to the other, very small as compared with $dt$, being shown by an oblique line).

The conventional signs are as follows:

An over-lined number, i.e. a number with a dash over it, indicates the whole of the values of $d$, cos $s$, sin $s$, cos $g$, sin $g$ with the index indicated by the number over which is the dash (for instance $\bar{1}$ means $d_1$, cos $s_1$, sin $s_1$, cos $g_1$, sin $g_1$), $\bar{S}$ represents tan $S_e$ at the moment or time that is considered, $\bar{G}$ represents tan $G_e$ at the moment or time that is considered, every vertical arrow indicating the period of availability of the magnitude or magnitudes inscribed opposite the upper end of the arrow.

Considering simultaneously FIGS. 6 and 7, it is seen that, at time 0, the laser rangefinder supplies the first indication of distance $d_1$ available in the input coder 53, whereas the sighting of the rangefinder supplies, through coders 56, 57, 58, 59, the values of cos $g_1$, sin $g_1$, cos $s_1$, sin $s_1$, these five values of index 1 being represented by $\bar{1}$ in FIG. 7. Finally, coders 66 and 67 deliver tan $G_e$ and tan $S_e$ represented by $\bar{G}$ and $\bar{S}$ in FIG. 7. These seven magnitudes are therefore available in the seven above mentioned coders (col. I of FIG. 7) at the beginning of period $0-dt$. At this zero time, switches $U_1$ and $U_2$ perform the switchings that have been represented: $U_1$ corrects the output of coder 67 which it sends to $V_1$, whereas $U_2$ sends the output of $V_1$ toward $V_3$.

| | $J_1$ | $J_2$ | $J_3$ | $J_4$ | $J_5$ | $J_6$ | $J_7$ | $J_8$ | $J_9$ | $J_{10}$ | $J_{11}$ | $J_{12}$ |
| --- | --- | --- | --- | --- | --- | --- | --- | --- | --- | --- | --- | --- |
| $dt$ | $d_1$ | cos $s_1$ | sin $s_1$ | cos $g_1$ | sin $g_1$ | tan $S_e$ | $d_2$ | cos $s_2$ | sin $s_2$ | cos $g_2$ | sin $g_2$ | tan $G_e$ |
| $3dt$ | $d_3$ | cos $s_3$ | sin $s_3$ | cos $g_3$ | sin $g_3$ | tan $S_e$ | $d_4$ | cos $s_4$ | sin $s_4$ | cos $g_4$ | sin $g_4$ | tan $G_e$ |
| $5dt$ | $d_5$ | cos $s_5$ | sin $s_5$ | cos $g_5$ | sin $g_5$ | tan $S_e$ | $d_6$ | cos $s_6$ | sin $s_6$ | cos $g_6$ | sin $g_6$ | tan $G_e$ |

During the 0–$dt$ period, switch $V_1$ connects its six inputs successively with its single output (see column VIII of FIG. 7). By the synchronous switching of $V_1$ and $V_3$ ($V_2$ being not fed by $U_2$) during the 0–$dt$ period, the six memories $I_1$, $I_2$, $I_3$, $I_4$, $I_5$, $I_6$ receive $d_1$, $\cos s_1$, $\sin s_1$, $\cos g_1$, $\sin g_1$ and $\tan S_e$, respectively, the five first values being represented by $\bar{I}$ and the last one by $\bar{S}$ (see col. II, FIG. 7, second portion of the 0–$dt$ period).

At time $dt$ (at the end of the 0–$dt$ period) $U_1$ performs a transfer and the sixth contact stud of $V_1$ now receives $\tan G_e$ instead of $\tan S_e$. $U_2$ also performs a transfer and now connects the output of $V_1$ with $V_2$ (and no longer with $V_3$). In these conditions, the synchronous rotation of $V_1$ and $V_2$ during the $dt$–$2dt$ period (column VIII) sends to memories $I_7$, $I_8$, $I_9$, $I_{10}$, $I_{11}$, $I_{12}$ respectively $d_2$, $\cos s_2$, $\sin s_2$, $\cos g_2$, $\sin g_2$ and $\tan G_e$ identified by $\bar{2}$ and $\bar{G}$. Memories $I_1$, $I_2$, ... $I_{11}$, $I_{12}$ now contain, during the second portion of the $dt$–$2dt$ period, the twelve values identified by $\bar{I}$ and $\bar{S}$ (transferred by $V_3$ during the 0–$dt$ period) and $\bar{2}$ and $\bar{G}$ (transferred by $V_2$ during the $dt$–$2dt$ period), as indicated by column II.

At the end of the $dt$–$2dt$ period, at time $2dt$, $V_4$ and $V_5$ perform, in synchronism (col. IX), the transfer of the contents $\bar{I}$, $\bar{S}$, $\bar{2}$, $\bar{G}$ from the intermediate memories $I_1$, $I_2$, ... $I_{11}$, $I_{12}$ into the corresponding final memories $J_1$, $J_2$, ... $J_{11}$, $J_{12}$. Consequently, at the beginning of the $2dt$–$3dt$ period, memories $J_1$, $J_2$, ... $J_{11}$, $J_{12}$ contain $\bar{I}$, $\bar{S}$, $\bar{2}$, $\bar{G}$, that is to say all the tracking and rangefinding quantities necessary to the computer for determining the present position and speed (at time $2dt$) of the target. Subsequent values will still be necesary to determine the future point F because it is necessary to calculate also the time of flight T, which brings other memories into play.

On the other hand, the contents of the intermediate memories $I_1$, $I_2$, ... $I_{11}$, $I_{12}$ having been transferred to the final memories $J_1$, $J_2$, ... $J_{11}$, $J_{12}$, memories $I_1$, $I_2$, ... $I_{11}$, $I_{12}$ are ready (after cancelling their indications through means not shown on the drawing) to receive new contents.

A new cycle starts for memories $I_1$, $I_2$, ... $I_{11}$, $I_{12}$ between times $2dt$ and $4dt$. Memories $I_1$ to $I_6$ receive, during the $2dt$–$3dt$ period, $\bar{3}$, $\bar{G}$ through switch $U_1$ (in its left hand position), switch $V_1$ (which comes successively into its six positions), switch $U_2$ (in its right hand position) and switch $V_3$. Then memories $I_7$ to $I_{12}$ receive, during the $3dt$–$4dt$ period, $\bar{4}$, $\bar{S}$ through switch $U_1$ (in its right hand position), switch $V_1$ (which comes successively into its six positions), switch $U_2$ (in its left hand position) and switch $V_2$. At the end of the $3dt$–$4dt$ period, switches $V_4$ and $V_5$ transfer to memories $J_1$ to $J_{12}$ the contents of memories $I_1$ to $I_{12}$ which are ready for a further cycle of operations.

Therefore, it will be seen that the opertion of the system 111 of FIG. 6, which has ben described with reference to columns I, II, III, VII, VIII, IX of FIG. 7, is cyclical, the period of the cycle being $2dt$ (twice the period of recurrence of the measurements of the distance of the target performed by the laser rangefinder, because two successive distances are necessary for calculating the speed of the target). In particular, if the rangefinder performs 20 measurements per second, $dt = 0.05$ s. and the cycle of system 111 lasts 0.1 second, every cycle being divided into two half-cycles between which switches $U_1$ and $U_2$ switch over.

I will now describe the system 112 of units of FIG. 6, which permits of determining the coordinates of the future point from a duration of the time of flight T obtained, as it will be hereinafter explained, in the units 113 for calculating the rough time of flight $Tb$, and 114, for calculating the correction $dT$ of the time of flight.

System 112 first comprises eight multipliers 115, 116, 117, 118, 119, 120, 121, 122 and three subtraction units 123, 124, 125 which determine the cartesian components $v_x$, $v_y$, $v_z$ of the speed $v$ of the target.

In particular, after time $2dt$, when memories $J_1$ to $J_{12}$ contain respectively $d_1$, $\cos s_1$, $\sin s_1$, $\cos g_1$, $\sin g_1$, $\tan S_e$, $d_2$, $\cos s_2$, $\sin s_2$ $\cos g_2$, $\sin g_2$, $\tan G_e$, symbolically illustrated in FIG. 7 by $\bar{I}$, $\bar{S}$, $\bar{2}$, $\bar{G}$ (column III period $2dt$–$4dt$), units 115 to 125 respectively deliver the following magnitudes:

115: $d_1 \cos s_1$
116: $d_1 \sin s_1$, i.e. $z_1$
117: $d_2 \cos s_2$
118: $d_2 \sin s_2$, i.e. $z_2$
119: $d_1 \cos s_1 \cos g_1$, i.e. $x_1$
120: $d_1 \cos s_1 \sin g_1$, i.e. $y_1$
121: $d_2 \cos s_2 \cos g_2$, i.e. $x_2$
122: $d_2 \cos s_2 \sin g_2$, i.e. $y_2$
123: $d_2 \cos s_2 \cos g_2 - d_1 \cos s_1 \cos g_1$, i.e. $v_x \cdot dt$ \hfill (9)
124: $d_2 \cos s_2 \sin g_2 - d_1 \cos s_1 \sin g_1$, i.e. $v_y \cdot dt$ \hfill (10)
125: $d_2 \sin s_2 - d_1 \sin s_1$, i.e. $v_z \cdot dt$ \hfill (11)

System 112 also comprises three multipliers 126, 127, 128, and three adding units 129, 130, 131, deducing the cartesian coordinates $X_f$, $Y_f$, $Z_f$ of the future point F from the outputs of 123, 124 and 125 and from $T/dt$ which is supplied from a unit 132 (which will be hereinafter referred to), and this in accordance with the following formulas:

$$X_f = x_2 + v_x \cdot T \quad (12 \text{ bis})$$
$$Y_f = y_2 + v_y \cdot T \quad (13 \text{ bis})$$
$$Z_f = z_2 + v_z \cdot T \quad (14 \text{ bis})$$

adding units 129, 130, 131 receiving, on their two inputs, the two terms of the second member of Formulas 12 bis, 13 bis, 14 bis respectively.

System 112 further comprises three multipliers 133, 134, 135 and two adding units 136, 137 for determining $(d_f)^2$, each of the multipliers 133, 134, 135 receiving, on both of its inputs, the same magnitude, so as to deliver the square thereof. Thus, 133 receives $X_f$ and delivers $(X_f)^2$, 134 receives $Y_f$ and delivers $(Y_f)^2$ and 135 receives $Z_f$ and delivers $(Z_f)^2$, whereas 136 delivers $(X_f)^2 + (Y_f)^2$ and 137 delivers $(X_f)^2 + (Y_f)^2 + (Z_f)^2 = (d_f)^2$.

Finally system 112 comprises the units necessary for converting the cartesian coordinates $X_f$, $Y_f$, $Z_f$ of the future point F into spherical coordinates $g_f$, $s_f$, for supplying the tangents of the spherical coordinates $G_c = g_f$ and $S_c = s_f + h$, and for determining the differences $$m = \tan G_c - \tan G_e$$

and $n = \tan S_c - \tan S_e$. These units are as follows:

A divider 138 receiving, through the eight positions switches $U_5$ and $U_6$ (only the two last positions of said switches being active), $X_f$ and $Y_f$ and supplying $$\frac{Y_f}{X_f} = \tan g_f = \tan G_c$$

said switches beginning the switching operations at time $2dt$ and switching over during, and at the end of, every period $dt$, from time $2dt$ (see FIG. 7, column X);

A subtraction unit or comparator 88 receiving the outputs of 138 and $J_{12}$ and delivering the difference $m = \tan G_c - \tan G_e$ which is sent, if it is in the digital form, to the digital analog comparator 90 (FIGS. 4 and 11), or, if it is in analog form, directly to amplifier 94;

A unit 139 for square root extraction which receives $(X_f)^2 + (Y_f)^2$ from 136 and delivers $$\sqrt{(X_f)^2 + (Y_f)^2}$$

A divider 140 for dividing $Z_f$ (received from 131) by $$\sqrt{(X_f)^2 + (Y_f)^2}$$

(received from 139); to deliver $$\tan s_f = \frac{Z_f}{\sqrt{(X_f)^2 + (Y_f)^2}}$$

tan $s_f$ being used, on the one hand, in combination with $(d_f)^2$ in generator means 60 and 61 (when this generator means also use tan $s_f$) which deliver the tangent of the elevation angle, tan $h$, and the time of flight T as a function of $(d_f)^2$ and of tan $s_f$; generator 61 receives these two magnitudes continuously, whereas generator 60 receives them through the eight position switches $U_7$ and $U_8$ (only the two last positions of which are active), these switches working in synchronism with switches $U_5$ and $U_6$ from time $2dt$ (see FIG. 7, column X), and, on the other hand, to determine, in the following units, tan $S_c$;

A multiplier 141 and an adding unit 142, each of them receiving tan $s_f$ from 140 and tan $h$ from 60, to calculate tan $s_f \times$ tan $h$ and tan $s_f +$ tan $h$, respectively;

An adding device 143 adding one unit to the output of 141 so as to deliver $1+$tan $s_f \times$ tan $h$ and a divider dividing the output 142 by the output of 143 so as to deliver.

$$\tan S_c = \frac{\tan s_f + \tan h}{1 + \tan s_f \times \tan h}$$

Finally a subtraction or comparator unit 89 receiving the outputs of 144 and of $J_6$ and delivering the difference $n=$tan $S_c-$tan $S_e$, which is transmitted, if it is in digital form, to the digital-analog converter 91 (FIG. 4), or, if it is already in analog form, directly to amplifier 95.

It is necessary now to explain with what units and how the computer of FIG. 6 determines the correct value of the time of flight T by the algorithms above indicated with reference to FIG. 9 (determination of the rough value $Tb$ of T) and to FIG. 10 (determination of the correction term $dT$ to be added to $Tb$ for giving T).

Concerning first the calculation of the rough value $Tb$, it is determined by system 113 which comprises:

An eight positions switch $U_4$ (two interconnected active positions, two interconnected active positions, two interconnected active positions, two inactive positions) rotating like switches $U_5$ to $U_8$ during, and at the end of, every $dt$ period, from time $2dt$;

A device for dividing by 1000, designated by 145, which receives the output of memory $J_7$, to wit $d_2$ at time $2dt$, and which delivers $To$, which is therefore available from time $2dt$ (see FIG. 7, column IV, wherein arrows indicate the availability of the determined magnitudes—whereas columns I, II and III represent the availability of the input magnitudes—the magnitudes in question being indicated at the level of the upper ends of the arrows). The output of 145, to wit $To$, is sent to the two first studs of switch $U_4$. Consequently, during period $2dt$–$3dt$, $U_4$ transmits $To$ to 132 which delivers $To/dt$ to multipliers 126, 127, 128. Units 126, 127, 128, 129, 130, 131, 133, 134, 135, 136 and 137 determine an approximate value of $(d_f)^2$ (based upon $To$) which reaches the time of flight generator 61 at the same time as an approximate value of tan $s_f$ (also based upon $To$) calculated by units 139 and 140 from the outputs of 135 and 137. Generator 61 then delivers the approximate value $Tso$, which is the ordinate of point H (FIG. 9) the abscissa of which is $To$, this value $Tso$ being used for the calculation of the rough value of T by Formula 15, whereas, on the contrary, the generator 60 of tan $h$, units 141, 142, 143, 144 for calculating tan $S_c$ and unit 138 for calculating tan $G_c$ are not fed with current (the movable part of switches $U_7$, $U_8$, $U_5$, $U_6$ being on an unconnected stud), because the approximate values of tan $h$, tan $S_c$ and tan $G_c$ are not used in this embodiment of the invention (it will be seen that, on the contrary, in the embodiment of FIG. 13 the angles $S_c$ and $G_c$ deduced from $To$ are imparted to the gun barrel);

A memory $J_{13}$ intended to store up $Tso$;

A switch $U_3$ analogous to switches $U_4$ to $U_8$ and rotating in synchronism therewith (FIG. 7, column X), but the output studs of which are connected differently so that in positions 2, 3 and 4, when it receives $Tso$ from 61, it delivers it to memory $J_{13}$ which thus receives said value $Tso$ which it stores up and which it transmits, when switch $U_4$ occupies positions 3 and 4 (period $3dt$–$4dt$), to unit 132, which corresponds to the determination of new approximate values of $(d_f)^2$ and tan $s_f$ from $\overline{1}, \overline{S}, \overline{2}, \overline{G}$, this determination being now based upon $Tso$. The time of flight generator 61 receives these new approximate values and operates at point E (FIG. 9) to deliver $Ts1$ to switch $U_3$ which now comes into its last four positions wherein it transmits $Ts1$ through conductor 146. As above, switches $U_5$, $U_6$, $U_7$, $U_8$ do not feed current, the determinations of tan $S_c$ and tan $G_c$ being based upon an approximate value of $Ts1$, and A subassembly for determining the rough value of T from $To$, $Tso$, $Ts1$ (and $dt$) according to Formula 15. This subassembly comprises:

A subtraction unit 148, which subtracts $2dt$ (constant equal for instance to 0.1 second) from the output of 145 and therefore delivers $To-2dt$ (abscissa of point G in FIG. 9);

Two multiplication units 149 and an addition unit 150 both receiving $Ts1$ from $U_3$ through 146 and $To-2dt$ from 148;

Two multipliers 151, 152, multiplier 151 receiving $Tso$ (from $J_{13}$) on both of its inputs and therefore delivering $(Tso)^2$, whereas multiplier 152 receives, on its single input, $Tso$ (from $J_{13}$) and multiplies this magnitude by two so as to deliver $2Tso$;

Two subtraction units 153, 154, the first one subtracting the output of 151 from that of 149 and the second subtracting the output of 152 from that of 150; and A divider 155 dividing the output of 153, to wit $(To-2dt)Ts1-(Tso)^2$, by the output of 154, to wit $Ts1+(To-2dt)-2Tso$, so as to deliver the rough value $Tb$ of T (identical coordinates of the point K of FIG. 9), to wit $$Tb = \frac{(To-2dt)Ts1-(Tso)^2}{Ts1-2Tso+To-2dt} \qquad (15 \text{ bis})$$

This rough value $Tb$ must be corrected with value $dT$ corresponding to the time interval, which is not equal to zero but to $2dt$, for calculating $Tb$ starting moment or time $2dt$.

For this purpose, the computer illustrated by FIG. 6 comprises system 114 which includes:

Three multipliers 156, 157, 158 each of which delivers the square of the magnitude it receives on both of its inputs, this magnitude being, respectively, $dx$ received from 123 and supplied to 156, $dy$ received from 124 and supplied to 157 and $dz$ received from 125 and supplied to 158;

An adding unit 159 which receives $(dx)^2$, $(dy)^2$, $(dz)^2$ from 156, 157, 158 respectively and delivers $$(dx)^2+(dy)^2+(dz)^2=(dn)^2$$

A unit 160 extracting the square root of the magnitude applied to its input, which receives $(dn)^2$ from 159 and therefore delivers $dn$ at its output;

A divider by 100, designated by reference numeral 161, receiving $dn$ from 160 and delivering $dn/100$;

A multiplier 162 multiplying its input by $$p_2 = 1000p_1 = 0.027$$

and an adding device 163, adding $k_1=0.062$, disposed in series, unit 162 receiving $To$ (that is to say $d/1000$) and therefore delivering $0.000027\ d$ to 163, which therefore delivers $0.062+0.000027\ d$, i.e. $k_1+p_1 d$, and A multiplier 164 receiving the outputs of 161 and 163 and therefore delivering $$dT = (k_1+p_1 d)\frac{d}{100}$$

This time of flight corrective term $dT$ is added to the rough time of flight $Tb$ in an adding unit 165 which receives the outputs of 164 ($dT$) and of 155 ($Tb$) and therefore delivers the correct value T of the time of flight to a memory $J_{14}$ which feeds the studs 5 and 6 of switch $U_4$. The latter therefore delivers T during the period from $4dt$ to $5dt$, the value of T being then available at the output of $U_4$. Units 126, 127 and 128 then receive the exact value of T and can undergo, together with units 129, 130, 131, the calculation of the exact values of the cartesian coordinataes $X_f, Y_f, Z_f$ of the future point F, which are determined at the beginning of the $5dt$–$6dt$ period (FIG. 7, column V, which gives the values obtained from the values located at the same level in column VI) from this value of T and from $\bar{3}, \bar{S}, \bar{4}, \bar{G}$. The correct values of $X_f, Y_f, (d_f)^2, \tan s_f$ are then available at the outputs of units 129, 130, 137 and 140 respectively, and switches $U_5, U_6, U_7, U_8$ which are then on their two last studs (the only ones to be active in the embodiment of FIG. 6), deliver these correct values to units 60 and 138 which therefore deliver the correct values of $\tan h$ and $\tan g_f = \tan G_c$. Unit 144 then delivers the correct value of $\tan S_c$. Finally, 88 and 89 deliver the correct values of $m$ and $n$.

The first complete cycle $SC_1$ which permits of determining $m$ and $n$, has therefore lasted $6dt$ and is therefore finished at time $6dt$. At this time, another complete cycle $SC_2$ starts. It will be noted that the second complete cycle $SC_2$ and the following cycles have only a duration of $4dt$, because the preliminary period PP between times 0 and $2dt$ is no longer necessary, since magnitudes $\bar{5}, \bar{S}, \bar{6}, \bar{G}$ are already available at time $6dt$. FIG. 7 thus illustrates between times 0 and $10dt$, the two first complete cycles (for the sake of simplicity this figure does not show the contents of columns 5 and 6 after the time $7dt$).

Thus it will be seen that the computer of FIG. 6 permits of calculating, with a rate of repetition of $4dt$, that is to say 0.2 second if $dt$ is equal 0.05 second, $\tan G_c$ and $\tan S_c$ which determine the values of the firing coordinates of the gun barrel. These values are compared, in comparators 88 and 89, to $\tan G_e$ and $S_e$ determined by the effective coordinates of the gun barrel, the differences $m = \tan G_c - \tan G_e$ and $n = \tan S_c - \tan S_e$ representing the difference to be corrected by the control means described with reference to FIGS. 4 and 5.

The above calculation requires knowing $g$ and $s$ substantially in a continuous manner (in particular at the times of sampling by $V_1$). If the target (aircraft) passes through clouds and is no longer visible through telescope 20, only $\sin g, \cos g, \sin s, \cos s$ are available in memories $J_1$ to $J_{12}$ (whereas the laser rangefinder 16 might, in some cases keep supplying the values of $d$) and the calculation of $\tan G$ and $\tan S$ is no longer possible.

This is why, in order to ensure the continuity of firing, an extrapolation device (already referred to with reference to FIG. 4) is provided for each magnitude G and S or $m$ and $n$. An embodiment of such an extrapolation device has been illustrated by FIG. 11, which shows an extrapolation device for $\tan G_c$ or $m$, the extrapolation device for $\tan S_c$ or $n$ being similar.

The magnitude $m = \tan G_c - \tan G_e$, normally delivered by comparator 88, is preliminarily transformed into analog magnitude in the case where it is digital when the extrapolation device is, as illustrated by FIG. 11, of the analog type (in the improved embodiment of FIG. 12 the apparatus is entirely of the digital type). A digital-analog converter 90 of a known type is used for this transformation. The output voltage of converter 90 (which represents, in the case of a normal following, the difference between the tangent of the effective bearing of the gun barrel and the tangent of the bearing that should be given to this barrel for reaching the target at future point F) passes through a normally "open" gate 166 the output of which is connected to a first input $94a$ of amplifier 94, which delivers the amplified control voltage M for the electro-valve 68 of the piston 98 of the hydraulic pump 72 (FIGS. 4 and 5). A differentiator 100 of a known type, including a resistor 167 and a capacitor 168, deduces the derivative $dM/dt$ of M. This derivative is fed in an impedance matcher 169 before being applied to a normally "closed" gate 102, the output of which is connected to a second input $94b$ of amplifier 94.

In case of normal optical tracking of the target by means of telescope 20, amplifier 94 therefore amplifies the output of 90, gate 166 being open whereas gate 102 is closed (it is the first input $94a$ of amplifier 94 which is fed with current). On the contrary, when the target aircraft is lost of view through telescope 20, the gunner or the central control unit 63 sends an order $0_0$ for the continuation of tracking, which is decomposed into two orders to wit a blocking order $0_1$ and an unblocking order $0_2$ (deduced from $0_0$ by conversion in a NON or inverter circuit 170). From this time on, gate 166 is closed whereas gate 102 is open and it is the second input $94b$ of amplifier 94 which is fed with the derivative $dM/dt$. Therefore the output of amplifier 94 keeps moving the gun barrel in accordance with the preceding law of displacement.

With the possible exception of the determination of the derivative of $m$ and $n$ (in the case of extrapolation devices of the type illustrated by FIG. 11), the operations are very advantageously carried out in the digital form in the system according to the present invention and it is such a digital embodiment of the computer of FIG. 6 according to the process illustrated by FIG. 7 which will now be described with reference to FIG. 8. However it should be noted that it is possible, if so desired, to apply some features of the invention in an analog form or in a mixed or hybrid form (partly analog and partly digital), the different units of FIG. 6 (adding units, multipliers, dividers, subtraction units, square root extraction units) being then constituted by analog units of known type, for instance of one of the types described in the book of Walter W. Soroka "Analog Methods in Computation and Simulation" (McGraw-Hill Books Company Inc. 1954). On the contrary the present description will relate to a preferred embodiment of a digital computer.

The digital electronic computer which will be hereinafter described with reference to FIG. 8 performs substantially the same operations as those above described with reference to FIGS. 6 and 7. However, whereas, in an analog computer, every unit of FIG. 6 truly exists, in a digital computer, the number of units is reduced, since the same unit, for instance the same multiplying unit, successively performs the same multiplication operation on different numbers. It is the program of instructions which determines the succession of operations and the input and/or calculated numbers on which the operations must be performed in every unit.

Here is the sequence flow sheet of the operations to be performed by the digital computer summing up the program of detailed instructions, attention being called to the two following points:

(1) It is necessary to perform, as above stated, three successive determinations of the coordinates of the future point, to wit:

Starting from T$o$ and from the first pair of coordinates $\bar{1}, \bar{S}, \bar{2}, \bar{G}$, T$so$ is determined by the time of flight generator means, Starting from T$so$ and from the next pair of coordinates $\bar{3}, \bar{S}, \bar{4}, \bar{G}$, T$s1$, then T$b$ is determined by Formula 15, and T is determined by adding $dT$ to T$b$, Starting from T and the third pair of coordinates $\bar{5}, \bar{S}, \bar{6}, \bar{G}$, the correct values of $X_f, Y_f, Z_f$ are obtained.

The sequence flow sheet must therefore comprise three successive "cycles" of calculation corresponding to the three successive active position of $U_4$ (FIG. 6). To this effect, there is introduced in the data a quantity, called L, which assumes, during the computing cycles, successively three values, such as $-E, 0, +E$, the change of value taking place on every determination of the time of flight by addition of $+E$ to the actual value of L (the initial value of L being $-E$). The machine performs, according to the values of L at the beginning of the determination of the time of flight the operations corresponding to the determination of T$so$, of T$si$, of T$b$ (then of T). Thus, taking for instance initially L as equal to $-1$ and adding a unit to L during every cycle of determination of the time of flight, that is to say E being taken equal to 1, the machine first compares L to 0. If L is smaller than 0 (which is the case of the first determination cycle), the machine proceeds in determining T$so$ and adding E (equal to 1) to L, so that L shifts from $-1$ to 0. On the contrary, if L is positive or equal to zero, the machine checks up the logical equivalence of L and E that is to say 1. In the particular example, in case of non equivalence (which is the case for the second cycle when E is equal to 0), the machine performs the determination of T$s1$ and the addition of E (equals to 1) to L, so that L shifts from zero to $+1$, whereas in case of logical equivalence, which is the case for the third cycle because L has become equal to $E=1$, the machine determines T$b$.

(2) Extraction of the square roots by the digital computer is performed by starting from an approximate value $p_i$ of the square root. $p_i$ is chosen for instance equal to 20 for the determination of $\sqrt{(dn)^2}$ (it being supposed that the target moves a distance of 20 meters during the time interval $2dt$) and equal to the greater of the numbers $X_f$, $Y_f$, for the determination of $\sqrt{(X_f)^2+(Y_f)^2}$, because this last mentioned square root is comprised between the greater of these numbers (in the case where the other would be equal to zero) and the product thereof by $\sqrt{2}$ (in the case where both numbers would be equal to each other). The machine performs the division of number $n_i$, the square root of which is to be extracted, by the approximate value $p_i$ and therefore determines the quotient $$q_i = \frac{n_i}{p_i}$$

Then it compares $q_1$ to $p_1$ and if the difference in absolute value $|q_1 - p_1|$ is greater than a very small given quantity $e$, it repeats the operation, taking as new approximate value of the square root $\frac{1}{2}(p_1+q_1)$, which becomes the new $p_1$. When, finally, there is obtained a value of $p_1$ such that $|q_1 - p_1|$ is smaller than $e$, the corresponding quotient $$q_i = \frac{n_i}{p_i}$$

is the value of the square root of $n_i$.

These two preliminarily explanations being given, here is an example of a sequence flow sheet for the digital computer.

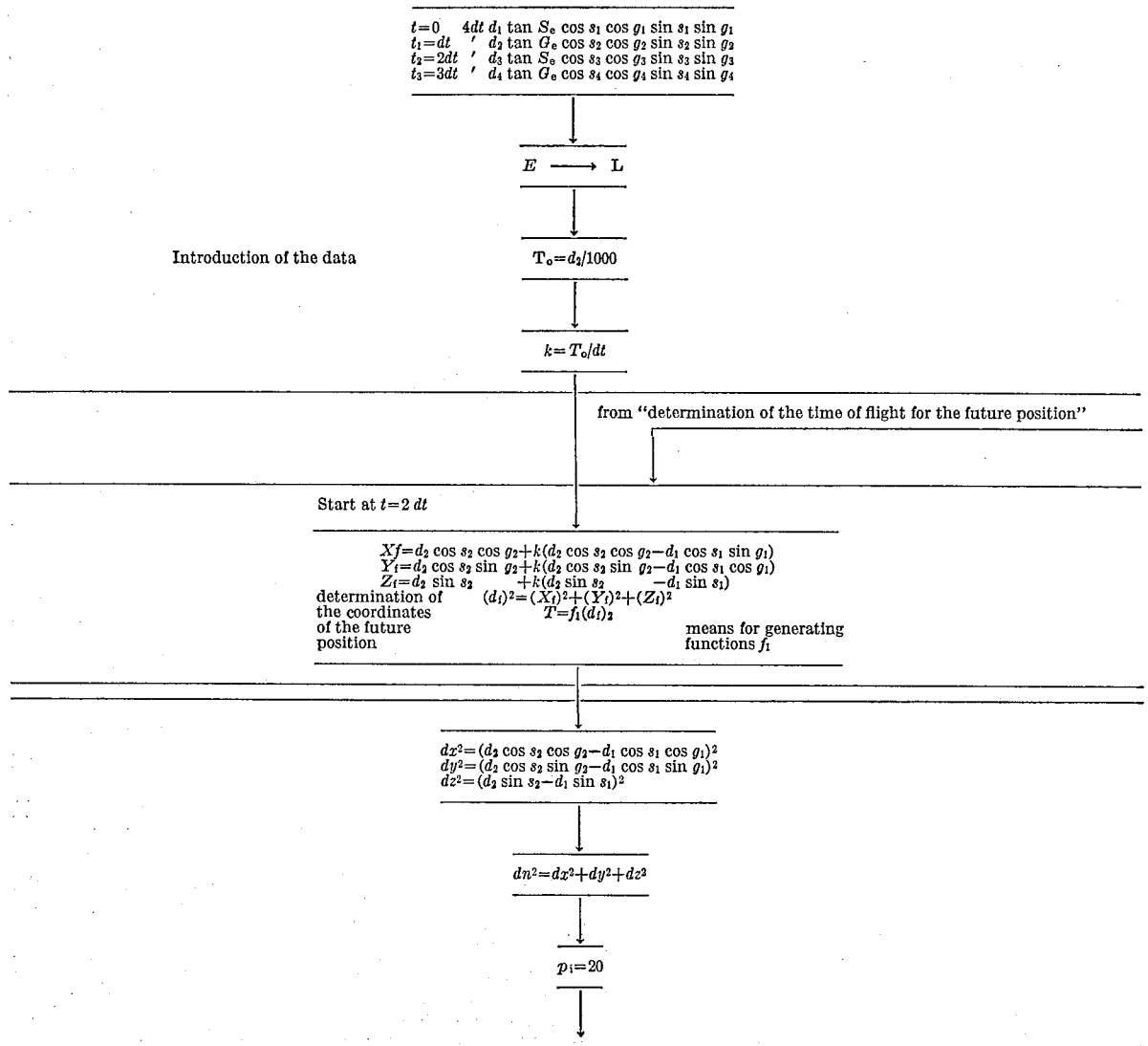

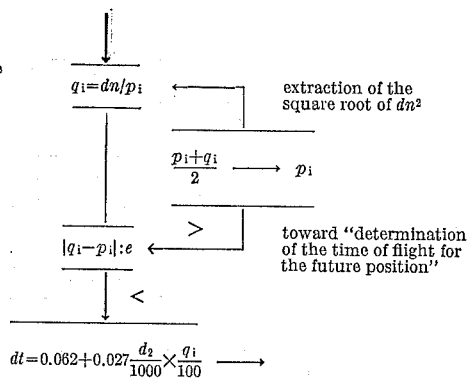
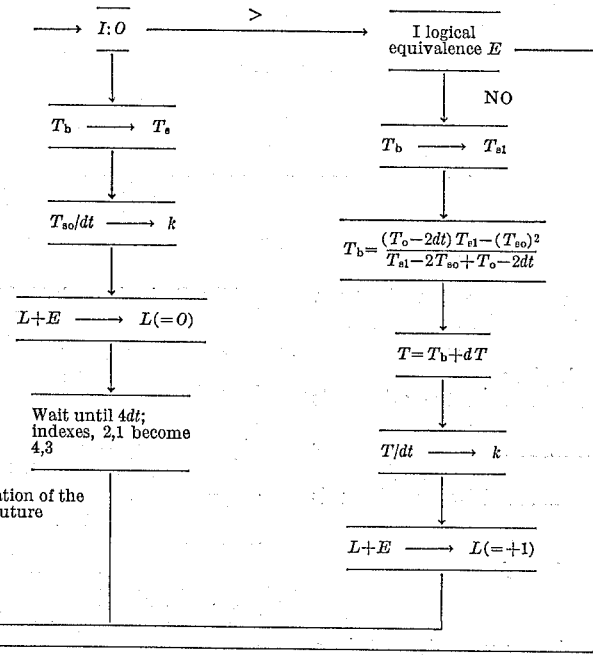
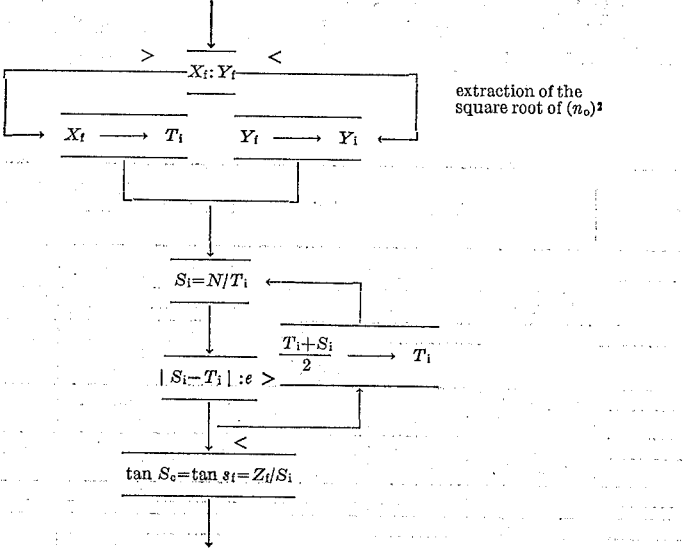

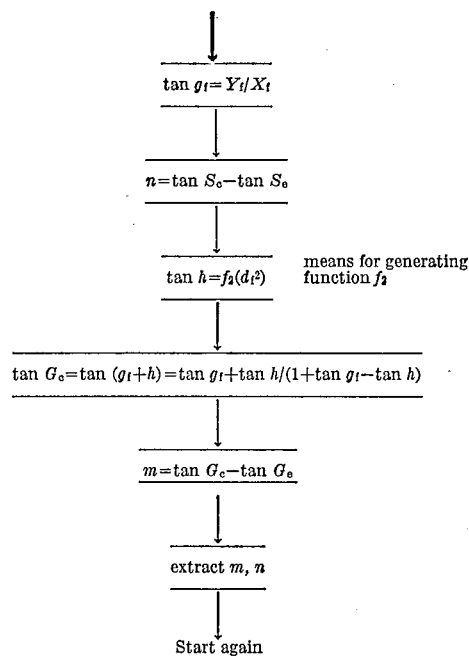

In order to carry out such a sequence flow sheet the computer must therefore essentially perform the following operations:

| | |
|---|---|
| Addition; subtraction; multiplication; division | In the arithmetic units. |
| Transfer; normal jump | From one register to another. |
| Conditional jump | If a condition is fulfilled. |

Logical equivalence; logical non-equivalence; direct shifting; generation of functions $f_1$ and $f_2$.

that is to say 11 operations.

Advantageously these operations are performed in a machine of the type illustrated by FIG. 8, bringing into play a method of series calculation in the pure binary code, with a variable position comma.

With a binary code, the input and the output signals may be defined as follows, by limiting the mantissas of the numbers to 13 binary orders or bits that is to say to 4096 distinct discrete values:

The limitation of 13 bits makes it necessary to limit the maximum values of angle $G_e$ and $S_e$ and also the amplitude of the output signals $m$, $n$.

In addition to the 13 bits for the mantissa of the numbers, it is necessary to provide 6 bits for the exponent (ranging from 0 to 16) and one bit for the sign that is to say a total of 20 bits for the magnitudes.

This may be summed up in the following table:

| | Sign | Exponent | Mantissa |
|---|---|---|---|
| d | + | From 11 to 14 | From 80 to 999. |
| cos, sin | ± | From 7 to 10 | From 0 to 999. |
| tan, m, n | ± | From 7 to 11 | From 0 to 4096. |
| T | + | From 8 to 11 | From 0 to 999. |

The computer processes the exponents and the mantissas separately.

As for the instructions, they are of the type with two addresses, to wit that of the register or memory from which the machine must extract the number to be processed and that of the register or memory to which the result is to be transferred, and they further comprise the

| Magnitude | Coming from | Limit of the true values | Definition | Limit of the values in the computer |
|---|---|---|---|---|
| d | Laser range-finder 16 | From 400 m to 4,500 m | 5 m | From 80 to 900. |
| cos s, cos g, sin s, sin g | Coders 56, 57, 58, 59 | From 0 to 0.999 | 0.001 | From 0 to 999. |
| tan $G_e$, tan $S_e$ | Coders 66, 67 | From 0 to 4.096 ($G_e$ and $S_e$ ranging from 0 to 78°5). | 0.001 | From 0 to 4096. |
| tan h | Angle of elevation generator means 60. | From 0 to 0.053 (h ranging from 0 to 3°). | 0.001 | From 0 to 53. |
| T | Time of flight generator means 61. | From 0 to 4.995 s | 0.005 s | From 0 to 999. |
| dt | Laser range-finder 16 | 0.05 s | 0.005 s | 10. |
| m, n | Output signals | From 0 to 4.096 | 0.001 | From 0 to 4096. | indication of the operation to be performed. The 11 operations above indicated may be individualized and designated by means of four bits, whereas for the addresses, which are coded in the ordinary binary system, 8 bits are provided (the machine comprises 192 memories). Consequently an instruction comprises 20 bits (four for the operation and twice 8 for every address respectively) that is to say as many bits as a number.

The above sequence flow sheet has a duration in pulses of 15,600 and must be performed in a time of $2dt$, that is to say 0.1 second if $dt$ is equal to 0.05 second. As the duration of a pulse must be lower than $0.1/15,600$ second, that is to say 6 microseconds, it suffices to take a time period of 5 microseconds, that is to say a frequency of 200 kilocycles per second.

The time of determination of the solution is, as above stated with reference to FIG. 7, $4dt$, that is to say 0.2 second.

All these digital operations are carried out in the computer of FIG. 8 which essentially comprises:

An input subassembly 218;
A subassembly of memories 219;
A subassembly of arithmetic units 220;
A subassembly of function generators 221;
A central control subassembly 222;
An output subassembly 171.

The input subassembly 218 comprises seven input conductors 172 for the input values $d$, $\cos s$, $\sin s$, $\cos g$, $\sin g$, $\tan G_e$, $\tan G_c$, the five first conductors being divided into two so that there are finally twelve inputs for an electronic switch $V_0$ which scans the six first inputs 173 during periods $0-dt$, $2-dt$ ... and the six last inputs 174 during periods $dt-2dt$, $3dt$, $4dt$ ... the indexes of the values that are scanned during the two first complete cycles of the switch (each of a duration equal to $2dt$) being indicated in FIG. 8 above the input conductors.

The output of $V_0$ is sent into twelve intermediate memories $I_1$ to $I_{12}$ and thence into subassembly 219. This subassembly 219 comprises:

Twelve fixed memories $J_1$ to $J_{12}$ for the data, receiving the contents of memories $I_1$ to $I_{12}$ through a multiple switch $V_5$, Two fixed memories $J_{15}$, $J_{16}$ for the outputs $m$ and $n$ which can be extracted by means of a two-way switch 175, Fixed memories 176 (for instance 128 of them) containing the instructions, Operational memories 177 (for instance 50 of them), and A selector of memories 178.

The output subassembly 171 comprises a two-way switch 179 working in synchronism with switch 175 so as to supply $m$ and $n$ on its two outputs.

The subassembly 220 of the arithmetic units comprises:

An adding and subtracting device 180 for the exponents (6 bits) with its associated accumulator 181 for the exponents (6 bits);

An adding and subtracting device 182 for the mantissas (13 bits) with its associated accumulator 183 for the mantissas (26 bits), Two registers 184, 185 for the "multiplication" and "division" logical units (each 13 bits), one for the multiplicand or the dividend and the other for the multiplier or divider, a "variable position comma" logical unit 186,
an "addition-subtraction" logical unit 187,
a "multiplication" logical unit 188,
a "division" logical unit 189,
a "sign" logical unit 190, these logical units controlling one or several of the units 180 to 185.

To this subassembly 220 of the arithmetical units is associated the subassembly 221 of the function generator 60 for the angle of elevation and 61 for the time of flight duration. Each of these generators 60, 61 comprises:

A decoder 191, 192 giving, for a given number of discrete values of $(d_t)^2$, the value either of $\tan h$ (decoder 191) or of $T$ (decoder 192), which issues at 193, 194, and also the unitary increment for $\tan h$ or $T$ respectively for one tenth (or one hundredth) of the difference between two successive discrete values of $(d_t)^2$, this increment being delivered at 195, 196, A counter 197, 198 which counts the number of unitary increments (arriving thereto from 194, 195) necessary for reducing to zero the difference (arriving thereto from 199, 220 of coder 191, 192) between the exact value of $(d_f)^2$ (arriving to subassembly 221 from the subassembly 219 of memories) and the nearest lower value of $(d_f)^2$ inscribed in coder 191, 192, A combining unit 201, 202 adding the output at 193, 194 of 191, 192 to the output of 197, 198 (that is to say the number of unitary increments counted by 197, 198) the output of the combining unit being sent to the memory subassembly 219.

Finally the central control subassembly 222 comprises, in addition to a feed 203:

A register of instructions 204 which receives at the initial time, when contactor 205 is closed by the gunner, the instructions stored up in fixed memories 176, A decoder of instruction 206 decoding as they arrive, the instructions of register 204 and transmitting them to the memory selector 178, An address counter 207 which, according to the indications of decoder 206, determines the address of the units from which the arithmetic units must extract numbers and to which these arithmetic units must supply said numbers, Units for the logical operations, to wit a shifting logical unit 208, an equivalence and non-equivalence unit 209, a normal jump and conditional jump logical unit 210, controlling these five logical operations, A clock 211 delivering pulses at the frequency of repitition of 200 kilocycles per second to control, through connections 212 and 213, multiple switches $V_0$ and $V_5$ on the one hand and synchronizing switches 175 and 179 on the other hand and also for the successive utilization of the instruction from unit 204, A counter 214 of the unitary pulses, counting the clock pulses delivered by 211, A counter 215 of the number of minor cycles (of 13 bits, that is to say 65 microseconds), A signal generator 216 for the operation phases and a signal generator 217 for the operation controls.

Preferably, the memories are constituted by means of magnetic tores. The various control units, the arithmetic units and the function generators are made by means of semi-conductors (diodes, transistors), and of magnetic tores and advantageously subassemblies or modular units. Finally the connections are provided in the form of printed circuits.

A numerical embodiment of computer 54 has been described with reference to FIG. 8. The interest of an entirely digital embodiment of the fire control system will be easily understood by those skilled in the art. FIG. 12 illustrates a control system, also of the digital type, adapted to be associated with the digital computer of FIG. 8 to constitute an entirely digital fire control system with important advantages in volume and weight reduction on the one hand and in cost of manufacture on the other hand.

It will be seen that in FIG. 12 the digital outputs $m$ and $n$ of computer 54 (outputs of units 89 and 88 respectively) that is to say the error signals $\tan G_c - \tan G_e$ and $\tan S_c - \tan S_e$, represented by pulses in the pure binary system, are treated in identical decoders 230, 231 for passing from the binary code to the decimal code, the first decoder for the error signals being concerned with the bearing angles, the second one with the vertical angles.

The outputs $m'$ and $n'$ of decoders 230, 231, which consists of trains of pulses representing in the decimal system the error signals tan $G_c$—tan $G_e$ and tan $S_c$—tan $S_e$, respectively, act upon digital servo-motors 234, 235 of a known type, for instance of the type manufactured and sold by the Japanese firm "Fujitsu Limited" of Tokyo under the designation "Electrohydraulic Pulse Motor." Such digital servo-motors actuate, in response to a digital control in the decimal system, a rotary pilot valve or pump and a hydraulic motor. FIG. 12 shows, in every digital servo-motor 234, 235 the step by step motor 232, 233 acted upon by the output $m'$, $n'$ from 230, 231 and the pump and hydraulic motor system 76, 77a acted upon by the output $Um$, $Un$ of the step by step motor associated therewith, $Um$ and $Un$ representing angles of rotation proportional to $m'$ (or $m$) and $n'$ (or $n$), respectively.

Assemblies 76a, 77a, which are driven by internal combustion engine 27, finally deliver, toward gears 80 and 81, corresponding respectively to the horizontal and vertical angles, angles G and S respectively.

In the case of a combination of a digital computer of the kind illustrated by FIG. 8 and of a control system, also of the digital kind, as shown by FIG. 12, extrapolation, when the target ceases to be visible is obtained not by the analog means of FIG. 11 but in digital manner by the computer itself, which includes in its program the determination of the derivatives of $m$ and $n$ as a function of time, by the following formulas $$\frac{d}{dt}(m) = \frac{m_{t+1} - m_t}{dt}$$

$$\frac{d}{dt}(n) = \frac{n_{t+1} - n_t}{dt}$$

the symbol $d/dt$ designating the derivative with respect to time and the indexes $t+1$ and $t$ indicating that the values of $m$ and $n$ are those corresponding to two successive times or moments separated by a unitary time interval, generally equal to $dt$.

Thus the system is entirely digital with the advantages above indicated.

Finally, it may be advantageous to speed up the movement of bringing the gun barrel into the direciton of the future point by providing means, according to the fourth feature of this invention, for immediately imparting to the gun barrel the firing coordinates determined from the approximate time of flight. To carry out this feature, the computer according to FIG. 6 should be modified by replacing the two portions AA thereof by the corresponding portion illustrated by FIG. 13, where the reference numerals are the same as in FIG. 6. The only difference between the two constructions lies in the fact that switches $U_5$ and $U_6$ on the one hand, and $U_7$ and $U_8$ on the other hand, instead of including six inactive studs and two active studs connected to a single output (FIG. 6) comprise two inactive studs and then six active studs connected to a common output (FIG. 13). In this case, this output is fed with current not only when the computer is able to deliver the correct value T of the time of flight, but already when the computer is capable of delivering approximate values, first T$o$ and then T$so$, of the time of flight. The barrel of the gun then comes to occupy, as soon as T$o$ is determined, a position close to the correct firing position. Then it moves, by displacement in the same direction nearer to the correct position (determination of T$so$), which it finally occupies when the correct value T of the time of flight is determined.

In these conditions, the gun barrel moves in an asymptotic manner toward its correct position without moving beyond it, so that the rapidity is increased and oscillations on either side of the correct position are eliminated.

The fire control system according to the present invention has the following advantages:

First it permits of determining, from the distance indications supplied by a laser rangefinder at time intervals equal to $dt$ (for instance at time intervals equal to 50 milliseconds) and from the substantially continuous indications of bearing and site obtained by visual tracking of the target, the coordinates at time intervals equal to $4dt$, for instance at time intervals of 200 milliseconds. In case of a laser operating in a continuous or substantially continuous manner, the invention will apply by making use of sample values of the distance taken at time intervals equal to $dt$.

The coordinates of the future point are calculated automatically, quickly and accurately without making use of iterative recurrence methods, which are long and often without efficiency.

The operation of the system is reliable because the computer brings into play strong electronic components which are highly reliable.

The gun barrel is controlled in a continuous manner in accordance with the firing coordinate, even during the periods for which the target is hidden, for instance by clouds.

In the preferred embodiments, where the computer sends to the control system the approximate values of the firing coordinates deduced from the approximate values of the time of flight, the gun barrel comes quickly and without oscillations into its correct position.

The system is of light weight and small volume, in particular when it is entirely digital (which is possible with the invention), so that it can be mounted on the support of a light antiaircraft gun.

It can easily be used by a single gunner who has only to follow the target in a sighting telescope and to actuate the release members.

Of course there may be modifications from the particular embodiments above described.

In particular, use might be made of a different type of computer, in particular of an analog or mixed (hybrid) type (analog and digital) computer and the rangefinder might be of a type supplying continuous distance indications, which would then be sampled same as the value of cos $g$, cos $s$, sin $g$, sin $s$.

On the other hand, it has been discovered that it was possible to reduce, or even to dispense with, the laser cooling means by causing the latter to operate only during a short initial period of time sufficient for determining the position and the velocity vector of the target at a given time. It will suffice for instance to perform about ten distance measurements by transmitting every time a set of photons from the laser.

For this purpose, according to the fifth feature of the present invention, the laser comprises at most rudimentary cooling means and said laser is made to perform a reduced number of measurements after taking the target into charge, for instance about ten measurements, until the coordinates of the target and the components of its velocity vector are accurately determined, the subsequent positions of the target being determined by calculation, it being supposed that the path of travel of the target is rectilinear and its speed is constant.

As a matter of fact, an aircraft has practically always, when attacking, a rectilinear path of travel along which it moves at a constant speed. Therefore, knowledge of the position of the aircraft in cartesian coordinates $X_D$, $Y_D$, $Z_D$, at a first given time $T_D$ and of its velocity vector V of components $v_x$, $v_y$, $v_z$, which are constant, permits of determining its position, of unknown cartesion $X_T$, $Y_T$, $Z_T$, at a subsequent time $T_T$ occurring a number $d_{DT}$ of seconds after time $T_D$, in accordance with the following formulas $$X_T = X_D + v_x \cdot d_{DT} \quad \text{(3 bis)}$$
$$Y_T = Y_D + v_y \cdot d_{DT} \quad \text{(4 bis)}$$
$$Z_T = Z_D + v_z \cdot d_{DT} \quad \text{(5 bis)}$$

Thus, it is possible to use the laser only during the first instant of the operation to determine, as above stated, $X_D$, $Y_D$, $Z_D$ (which may be for instance the above mentioned magnitudes $x_2$, $y_2$, $z_2$), and $v_x$, $v_y$, $v_z$.

The digital computer above described will then determine from $X_D$, $Y_D$, $Z_D$, $d_{DT}$ and $v_x$, $v_y$, $v_z$ the values of $X_T$, $Y_T$, $Z_T$ in accordance to formulas (3 bis), (4 bis), (5 bis) in the same manner as it determined $x_t$, $y_t$, $z_t$ from $x_2$, $y_2$, $z_2$ and $v_x$, $v_y$, $v_z$ by the above Formulas 12, 13, 14.

According to a modification, it will be possible to stop the operation of the laser after some measurements and to follow the aircraft by extrapolation, as above indicated in case of loss of sight thereof in clouds, although, actually, the aircraft would remain visible.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A fire control system for directing a gun toward a target which comprises, in combination,
    means for determining substantially in a continuous manner the angular coordinates of said target,
    means for determining the distance of the target from the gun at regular time intervals, and
    means for calculating the angular coordinates to be given to said gun, so that a projectile fired therefrom normally reaches said target, from said angular coordinates of the target, the distance of the target from the gun, the duration of said time intervals and the indications of firing tables giving, for said distance, the time of flight of the projectile and the elevation angle to be given to the gun, the calculated time of flight of the projectile being determined, by an algorithm, repetitive, but without iteration, from an estimated approximate time of flight of the projectile and from the duration of said time intervals.

2. A fire control system for directing a gun toward a target which comprises, in combination,
    means for determining substantially in a continuous manner the bearing and the site of said target,
    means for determining the distance of the target from the gun at regular time intervals, and
    means for calculating the angular coordinates to be given to said gun so that a projectile fired therefrom normally reaches said target, from said angular coordinates of the target, the distance of the target from the gun, the duration of said time intervals and the indications of firing tables giving, for said distance, the time of flight of the projectile and the elevation angle to be given to the gun, the calculated time of flight of the projectile being determined, by an algorithm, repetitive, but without iteration, from an estimated approximate time of flight of the projectile and from the duration of said time intervals.

3. A fire control system for directing a gun toward a target which comprises, in combination,
    means for determining substantially in a continuous manner the angular coordinates of said target,
    a pulsed laser rangefinder for determining in digital form at regular time intervals the distance of the target from the gun, the constant period of repetition of said laser rangefinder which is equal to said time intervals being shorter than one second, and
    means for calculating the angular coordinates to be given to said gun, so that a projectile fired therefrom normally reaches said target, from said angular coordinates of the target, the distance of the target from the gun, the duration of said time intervals the indications of firing tables giving, for said distance, the time of flight of the projectile and the elevation angle to be given to the gun, the calculated time of flight of the projectile being determined, by an algorithm, repetitive, but without iteration, from an estimated approximate time of flight of the projectile and from the duration of said time intervals.

4. A fire control system for directing a gun toward a target which comprises, in combination,
    means for determining substantially in a continuous manner the bearing of said target,
    means for determining substantially in a continuous manner the site of said target,
    means for determining the distance of the target from the gun at regular time intervals, and
    a computer including,
    a bearing coder arranged to receive at its input, from said bearing determining means, said target bearing and to deliver, at its output, the values of the cosine and the sine of said target bearing,
    a site coder arranged to receive at its input, from said site determining means, said target site and to deliver at its output the values of the cosine and the sine of said target site,
    generator means, arranged to receive at the input thereof from said distance determining means through squaring means the square of the distance of the target from the gun, for delivering, at the output thereof, the value of the angle of elevation of the gun barrel,
    generator means, arranged to receive at the input thereof from said distance determining means through said squaring means the square of the distance of the target from the gun, for delivering the value of the time of flight of the projectile from the gun,
    computer unit means through said squaring means responsive to said respective delivered values for delivering the tangents of the horizontal angle and of the vertical angle of the gun from reference planes, and
    means responsive to the outputs of said computer unit means for aiming said gun barrel in accordance with the values of said last mentioned tangents, so that a projectile fired from said gun normally reaches said target.

5. A system according to claim 4 wherein said computer is a digital computer.

6. A fire control system for directing a gun toward a target which comprises, in combination,
    means for determining substantially in a continuous manner the bearing of said target,
    means for determining substantially in a continuous manner the site of said target,
    means for determining the distance of the target from the gun at regular time intervals, and
    a digital computer including,
    a bearing coder arranged to receive at its input, from said bearing determining means, said target bearing and to deliver, at its ouput, the values of the cosine and the sine of said target bearing,
    a site coder arranged to receive at its input, from said site determining means, said target site and to deliver at its output the values of the cosine and the sine of said target site,
    generator means, arranged to receive at the input thereof from said distance determining means through squaring means the square of the distance of the target from the gun, for delivering the value of the angle of elevation of the gun barrel,
    generator means arranged to receive at the input thereof from said distance determining means through said squaring means the square of the distance of the target from the gun, for delivering the value of the time of flight of the projectile from the gun,
    computer unit means responsive to said respective delivered values for delivering the tangents of the horizontal angle and of the vertical angle of the gun from reference planes, and digital means directly responsive to the outputs of said computer unit means for aiming said gun barrel in accordance with the values of said last mentioned tangents, so that a projectile fired from said gun normally reaches said target.

7. A system according to claim 6 wherein, said means for determining the distance of the target from the gun consist of a pulsed laser rangefinder delivering said distance in digital form the constant period of repetition of said laser rangefinder, which is equal to the duration of said time intervals, being shorter than one second.

8. In a fire control system for directing a gun toward a moving target, a device for calculating the time of flight of a projectile striking said target which comprises, in combination, means for determining, from an estimated approximate time of flight of the projectile, the coordinates of the future position of the target at the end of said estimated approximate time of flight, means for deducing from the indications of the firing tables of the gun a first calculated approxiate time of flight corresponding to said future point, means for determining, from said first calculated approximate time of flight, new coordinates of a future point corresponding to said first calculated approximate time of flight, means for deducing, from the indication of said firing tables, a second calculated approximate time of flight and means for deducing therefrom a raw time of flight, according to the formula $$T_b = \frac{(T_o - 2dt)T_{s1} - (T_{so})^2}{T_{s1} - 2T_{so} + T_o - 2dt}$$

wherein $T_b$ is said raw time of flight, $T_o$ the estimated approximate time of flight, $T_{so}$ the first calculated approximate time of flight, $T_{s1}$ the second calculated approximate time of flight and $dt$ the duration of the time intervals between the successive determinations of the distance of the target from the gun.

9. A fire control system for directing a gun toward a target which comprises, in combination, means for determining substantially in a continuous manner the bearing of said target, means for determining substantially in a continuous manner the site of said target, means for determining the distance of the target from the gun at regular time intervals, a computer including a bearing coder arranged to receive at its input, from said bearing determining means, said target bearing and to deliver, at its output, the values of the cosine and the sine of said target bearing, a site coder arranged to receive at its input, from said site determining means, said target site and to deliver at its output the values of the cosine and the sine of said target site, a first generator device, arranged to receive at the input thereof from said distance determining means through a squaring device the square of the distance of the target from the gun, for delivering, at the output thereof, the value of the angle of elevation of the gun barrel, a second generator device arranged to receive at the input thereof from said distance determining means through said squaring device the square of the distance of the target from the gun, for delivering the value of the time of flight of the projectile from the gun, said second generator device comprising means for determining, from an estimated approximate time of flight of the projectile, the coordinates of the future position of the target at the end of said estimated approximate time of flight, means for deducing from the indications of the firing tables of the gun a first calculated approximate time of flight corresponding to said future point, means for determining, from said first calculated approximate time of flight, new coordinates of a future point corresponding to said first calculated approximate time of flight, means for deducing, from the indication of said firing tables, a second calculated approximate time of flight and means for deducing therefrom a raw time of flight, according to the formula $$T_b = \frac{(T_o - 2dt)T_{s1} - T_{so})^2}{T_{s1} - 2T_{so} + T_o - 2dt}$$

wherein $T_b$ is said raw time of flight, $T_o$ the estimated approximate time of flight, $T_{so}$ the first calculated approximate time of flight, $T_{s1}$ the second calculated approximate time of flight and $dt$ the duration of the time intervals between the successive determinations of the distance of the target from the gun, computer unit means responsive to said respective delivered values for delivering the tangents of the horizontal angle and of the vertical angle of the gun from reference planes, and means responsive to the outputs of said computer unit means for aiming said gun barrel in accordance with the values of said last mentioned tangents, so that a projectile fired from said gun normally reaches said target.

10. A system according to claim 9 wherein the estimated approximate time of flight is the quotient of the distance of the target from the gun by a predetermined number.

11. A system according to claim 9 wherein the estimated approximate time of flight in seconds is the quotient of the actual distance, in meters, by a number substantially equal to one thousand.

12. A system according to claim 8 further comprising means for adding to said raw time of flight a corrective term representing the time taken for determining said raw time of flight.

13. A system according to claim 9 further comprising means for adding to said raw time of flight a corrective term representing the time taken for determining said raw time of flight.

14. A system according to claim 9 further comprising means for adding to said raw time of flight a corrective term representing the time taken for determining said raw time of flight, said corrective term being given by the formula $dT = (k_1 + p_1 d)dn$, wherein $dT$ is the corrective term, $d$ is the distance of the target from the gun, $dn$ is the distance travelled over by the target during the time for determining the raw time of flight, and $k_1$ and $p_1$ are constants.

15. A system according to claim 9 further comprising means for adding to said raw time of flight a corrective term representing the time taken for determining said raw time of flight, said corrective term being given by the formula $$dT = (0.062 + 0.000027d).dn$$

wherein $dT$ is the corrective term, $d$ is the distance of the target from the gun, and $dn$ is the distance travelled over by the target during the time for determining the raw time of flight.

16. A system according to claim 9 wherein said means for aiming the gun are operative from the time said approximate time of flight is set.

17. A system according to claim 3 comprising means for limiting the operation of said laser rangefinder just to the time necessary for determining the target coordinates at a given moment and the components of its velocity vector at said moment, and means for computing from these data the subsequent positions of the target supposed to move along a rectilinear path with a constant speed.

18. A system according to claim 7 comprising means for limiting the operation of said laser rangefinder just to the time necessary for determining the target coordinates at a given moment and the components of its velocity vector at said moment, and means for computing from these data the subsequent positions of the target supposed to move along a rectilinear path with a constant speed.

References Cited

UNITED STATES PATENTS 2,710,720  6/1955  Blackman et al. _____ 235—61.5
2,922,572  1/1960  Miner et al. _____ 235—61.5
2,977,049  3/1961  Miner et al. _____ 235—61.5 X BENJAMIN A. BORCHELT, *Primary Examiner.*

W. C. ROCH, *Assistant Examiner.*

CERTIFICATE OF CORRECTION

Patent No. 3,339,457 September 5, 1967

Lucas Pun

It is hereby certified that error appears in the above numbered patent requiring correction and that the said Letters Patent should read as corrected below.

Column 8, formula "(15)" should appear as shown below instead of as in the patent:

$$\tan S = \tan(s_f + h) = \frac{\tan s + \tan h}{1 - \tan s_f \tan h}$$

column 11, formula "(16)" should appear as shown below instead of as in the patent:

$$dT = (0.062 + \frac{0.027}{1000})\frac{dn}{100}$$

column 15, line 17, for "$1 + \tan s_f \times \tan h$" read -- $1 - \tan s_f \cdot \tan h$ --; lines 20 and 21, the formula should appear as shown below instead of as in the patent:

$$\tan Sc = \frac{\tan sf + \tan h}{1 - \tan sf \cdot \tan h}$$

columns 23 and 24, in the "block" immediately below the fourth arrow from the top of the page, the formula should appear as shown below instead of as in the patent:

$$\tan Gc = \tan(g_f + h) = (\tan g_f + \tan h)/(1 - \tan g_f \tan h)$$

Signed and sealed this 1st day of October 1968.

(SEAL)
Attest:

EDWARD M. FLETCHER, JR.
Attesting Officer

EDWARD J. BRENNER
Commissioner of Patent